(12) United States Patent
Wechsler et al.

(10) Patent No.: US 9,005,400 B2
(45) Date of Patent: Apr. 14, 2015

(54) DEVICE AND METHOD FOR CONTROLLING THE CONVERSION OF BIOMASS TO BIOFUEL

(75) Inventors: Mark Wechsler, San Mateo, CA (US); James Braig R, Piedmont, CA (US)

(73) Assignee: Renewable Fuel Technologies, Inc., San Francisco, CA (US)

( * ) Notice: Subject to any disclaimer, the term of this patent is extended or adjusted under 35 U.S.C. 154(b) by 535 days.

(21) Appl. No.: 13/221,497

(22) Filed: Aug. 30, 2011

(65) Prior Publication Data

US 2012/0117815 A1    May 17, 2012

Related U.S. Application Data

(60) Provisional application No. 61/378,252, filed on Aug. 30, 2010.

(51) Int. Cl.
| | | |
|---|---|---|
| *C10B 47/00* | (2006.01) | |
| *C10L 9/08* | (2006.01) | |
| *C10B 53/02* | (2006.01) | |
| *C10L 1/02* | (2006.01) | |
| *C10B 47/44* | (2006.01) | |
| *C10L 9/02* | (2006.01) | |
| *C10G 45/72* | (2006.01) | |
| *C10L 5/44* | (2006.01) | |
| *G01J 3/42* | (2006.01) | |
| *G01J 3/453* | (2006.01) | |

(52) U.S. Cl.
CPC ............. *C10L 9/083* (2013.01); *C10G 2300/30* (2013.01); *C10B 53/02* (2013.01); *C10L 1/02* (2013.01); *C10G 2300/708* (2013.01); *C10G 2300/1011* (2013.01); *C10B 47/44* (2013.01); *C10L 9/02* (2013.01); *C10G 45/72* (2013.01); *C10L 5/44* (2013.01); *F26B 2200/24* (2013.01); *G01J 3/42* (2013.01); *G01J 3/453* (2013.01); *Y02E 50/10* (2013.01); *Y02E 50/15* (2013.01); *Y02E 50/30* (2013.01)

(58) Field of Classification Search
CPC ........... C10L 1/02; C10L 5/447; C10L 9/083; C10L 9/02; C10G 45/72; C10G 2300/1011; C10G 2300/30; C10G 2300/708; C10B 53/00; C10B 53/02; C10B 47/00; C10B 47/44
USPC ............ 585/240–242; 44/605, 606; 201/1, 41
See application file for complete search history.

(56) References Cited

U.S. PATENT DOCUMENTS

| | | | | |
|---|---|---|---|---|
| 4,370,201 A * | 1/1983 | Lowenhaupt | ..................... | 201/1 |
| 4,692,216 A * | 9/1987 | Polansky et al. | ................... | 201/1 |
| 4,701,838 A * | 10/1987 | Swinkels et al. | ................ | 700/44 |
| 7,985,345 B2 * | 7/2011 | Lux et al. | ...................... | 210/770 |
| 8,318,997 B2 * | 11/2012 | McAlister | .................... | 585/240 |
| 8,647,586 B2 * | 2/2014 | Shulenberger et al. | ........ | 422/200 |
| 2007/0220805 A1 * | 9/2007 | Leveson et al. | ................. | 44/605 |
| 2008/0286557 A1 * | 11/2008 | Tucker | ....................... | 428/318.4 |
| 2009/0007484 A1 * | 1/2009 | Smith | .............................. | 44/606 |

(Continued)

*Primary Examiner* — Prem C Singh
*Assistant Examiner* — Jonathan Miller
(74) *Attorney, Agent, or Firm* — Steven R. Vosen

(57) ABSTRACT

Embodiments presented herein describe an apparatus and method to control the conversion of carbonaceous materials, particularly biomass and those biomass resources, into a high performance solid fuel. This method, and the apparatus described as the means to accomplish this method, provides a process having a control system that enables the system to produce a fuel of uniform quality, even with a change in biomass supply.

25 Claims, 16 Drawing Sheets

(56) References Cited

U.S. PATENT DOCUMENTS

| | | | |
|---|---|---|---|
| 2009/0193679 A1* | 8/2009 | Guyomarc'h | 34/467 |
| 2011/0136971 A1* | 6/2011 | Tucker | 524/587 |
| 2011/0179700 A1* | 7/2011 | Monroe et al. | 44/589 |
| 2011/0214343 A1* | 9/2011 | Wechsler et al. | 44/605 |
| 2011/0314728 A1* | 12/2011 | Camper et al. | 44/606 |
| 2012/0085023 A1* | 4/2012 | Teal et al. | 44/605 |
| 2012/0159842 A1* | 6/2012 | Teal et al. | 44/605 |

* cited by examiner

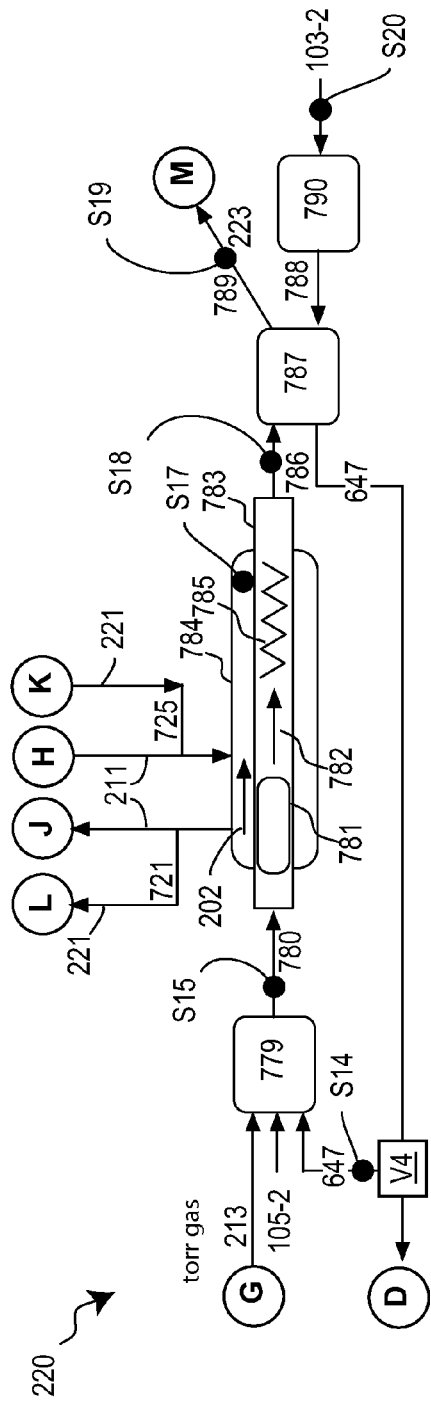
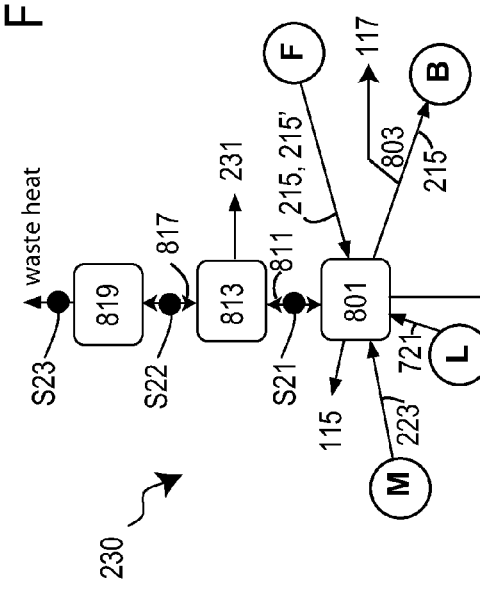
Figure 3C
Figure 3D

DEVICE AND METHOD FOR CONTROLLING THE CONVERSION OF BIOMASS TO BIOFUEL

CROSS-REFERENCE TO RELATED APPLICATIONS

This application claims the benefit of U.S. Provisional Application No. 61/378,252 filed Aug. 30, 2010. The entire contents of the above-listed provisional application are hereby incorporated by reference herein and made part of this specification.

BACKGROUND OF THE INVENTION

1. Field of the Invention

The present invention generally relates to the production of fuels from biomass, and more particularly to methods and systems for measuring materials to control the production of fuels.

2. Discussion of the Background

The use of solid fuels is the world's largest energy market. In the United States, solid fuels are used primarily for generating electric power and in metallurgic and cement manufacturing processes. This market is dominated by non-renewable resources, principally coal, and to a lesser extent petroleum coke. Biomass sources, which are generally considered to be renewable, form less than 5% of the U.S. Market.

There is an urgency to switch to energy sources that will have less of an environmental impact, especially with regards to the emission of greenhouse gases. Biomass sources are an attractive alternative to conventional solid fuels, but high transportation costs and low energy density of the biomass materials have hindered their widespread use.

Methods to improve the fuel value and physical properties of biomass range include drying the biomass to remove moisture without chemically altering the biomass, and producing charcoal from the biomass, where the biomass is chemically altered into fixed carbon. Drying is accomplished at temperatures below 120° C., while charcoal production requires temperatures above 500° C. Both drying and producing charcoal are incomplete solutions, and do not enable the access to remote biomass resources.

Drying the biomass combined with grinding and pelletizing the resultant fuel produces a fuel with energy density of between 7,000 Btu per pound (16,000 kJ/kg) and 8,000 Btu per pound (19,000 kJ/kg), and a density of 0.6 g/cm$^3$ (600 kg/m$^3$) and 1 g/cm$^3$ (1,000 kg/m$^3$), and is something of an improvement. However the pellets are intolerant to water, are capable of spontaneous combustion, and are thus difficult to store.

Producing charcoal is inefficient, with only 20% to 30% of the energy in the original biomass preserved in the charcoal. So much energy is lost that producing charcoal for fuel is discouraged except for use in metallurgical processes, where it is mandatory and thus unavoidable. In addition, densifying charcoal requires a binder, a severe limitation when operating remotely. In either case, the resultant fuel is unsatisfactory for widespread application to industrial combustion processes.

One approach to facilitate the use of biomass as solid fuel is to utilize a process to convert biomass to biofuel. In a process to convert biomass to biofuel, the quantity and properties of the output biofuel and intermediate products will depend on the properties of the input biomass and the applied process parameters. Since input biomass can be variable and not well-characterized with respect to properties such as plant species, moisture content and particle size, among others, there is a significant risk that important properties of the produced biofuel, such as energy density, will be poorly controlled, variable and uncharacterized. This is undesirable and will yield low quality fuel.

Thus there is a need in the art for a method and apparatus to monitor processed material properties at one or more locations in the conversion process and to utilize those measurements to control process parameters, to produce output product with desired properties and/or to quantify important biofuel properties.

BRIEF SUMMARY OF THE INVENTION

Certain embodiments described herein overcome the disadvantages of the prior art by torrefaction, and pellitization of the resulting biomass. The biofuel thus produced may have an energy density superior to lower grade fossil coals, and physical properties, such as density, grindability, or water tolerance, that are compatible with industry needs.

One embodiment provides an apparatus for the continuous torrefaction of biomass to obtain a fuel of specified or constant properties. The apparatus includes a sensor to measure a property of biomass in the apparatus; and a control system adapted to change the conditions of torrefaction in proportion to an output of the sensor.

Another embodiment provides a method for the continuous torrefaction of biomass to obtain a fuel of specified or constant properties. The method includes sensing a property of biomass; and controlling the torrefaction in proportion to the property.

Yet another embodiment provides an apparatus for the continuous torrefaction of biomass to obtain a fuel of specified or constant properties. The apparatus includes a control system adapted to receive a mid-infrared (mid-IR) measurement of biomass torrefied in the apparatus, and change the conditions of torrefaction in proportion to the measurement.

One embodiment provides a method for the continuous torrefaction of biomass in a torrefaction reactor to obtain a fuel of specified or constant properties. The method includes controlling the torrefaction reactor using a mid-IR measurement of torrefied biomass.

Another embodiment provides an apparatus for estimating the ratio of H/C/O in a sample. The apparatus includes a device to obtain a mid-IR spectra of the sample and a computer having stored instructions including a correlation of mid-IR spectra and two ratios of H, C, and O atoms. The computer is programmed to perform the steps of applying the correlation to estimate, based on the correlation, two ratios of H, C, and O atoms in the sample.

Yet another embodiment provides a method of estimating the ratio of H/C/O in a sample. The method includes obtaining a correlation between the mid-IR spectra with two ratios of H, C, and O atoms; obtaining a mid-IR spectra for the sample; and applying the correlation to estimate two ratios of H, C, and O atoms in the sample.

One embodiment provides an apparatus to torrefy biomass to obtain target values of H, C, and O atoms in the torrefied biomass. The apparatus includes an apparatus configured to estimate two ratios of H, C, and O atoms in a torrefied sample, and a control system including a computer programmed to change torrefaction parameters to approach the target values of H, C, and O atoms.

Another embodiment provides a method of controlling the torrefaction of a biomass to obtain target values of H, C, and O atoms. The method includes estimating two ratios of H, C, and O atoms in a torrefied sample, and changing parameters of the torrefaction to approach the target values of H, C, and O atoms.

Yet another embodiment provides an apparatus for estimating contamination in a sample. The apparatus includes a device to obtain a mid-IR spectra for the sample; and a computer having a stored correlation between mid-IR spectra and levels of contamination, where control system accepts the mid-IR spectra and determines contamination in the sample.

One embodiment provides a method of determining contamination in a sample. The method includes obtaining a correlation between the mid-IR spectra and level of contamination, obtaining a mid-IR spectra for the sample, and applying the level of contamination in the sample.

These features together with the various ancillary provisions and features which will become apparent to those skilled in the art from the following detailed description, are attained by the apparatus and method of the present invention, preferred embodiments thereof being shown with reference to the accompanying drawings, by way of example only, wherein:

BRIEF DESCRIPTION OF THE SEVERAL VIEWS OF THE DRAWING

FIG. 3C is a schematic of a heat recovery unit of the embodiment of FIG. 2A;

FIG. 3D is a schematic of a power generator of the embodiment of FIG. 2A;

Reference symbols are used in the Figures to indicate certain components, aspects or features shown therein, with reference symbols common to more than one Figure indicating like components, aspects or features shown therein.

DETAILED DESCRIPTION OF THE INVENTION

Figure 1:
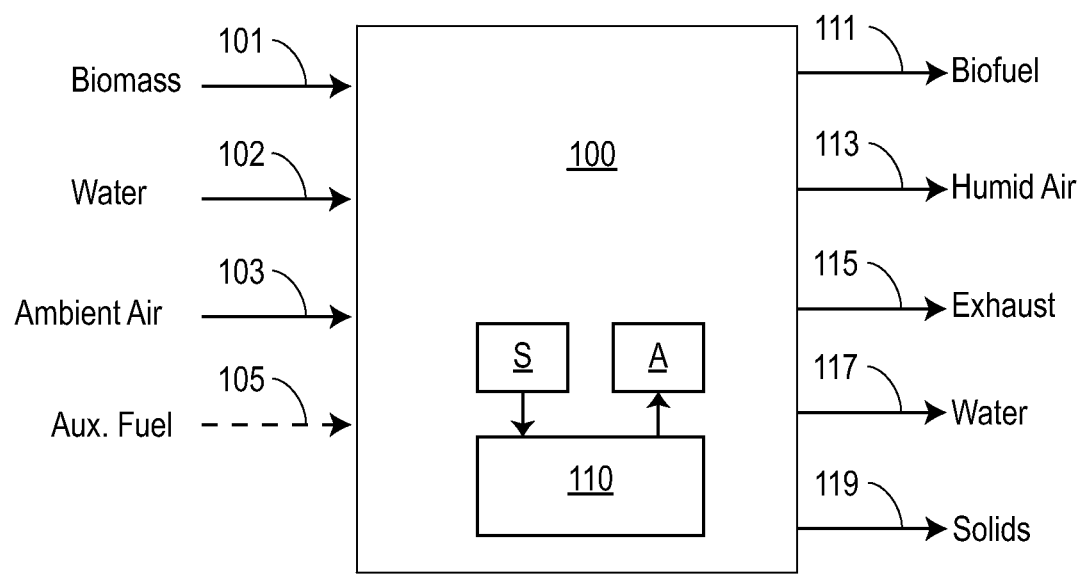
FIG. 1 is a general schematic of an apparatus for converting biomass to biofuel.

FIG. 1 is a general schematic of an apparaus 100 for converting biomass to biofuel. The term "biomass" is a general term that refers to living matter or formerly living matter. It may include, for example and without limitation, material specifically grown or gathered for conversion to biofuel, or waste products from the use or maintenance of plants. Examples of biomass include, but are not limited to, woody biomass, agricultural byproducts, and municipal green waste. A "biofuel" is a fuel composed of or produced from biological raw materials. One type of preferred biofuel is a solid that is compatible with existing power plants, allowing for the reduction or elimination of conventional hydrocarbon fuels. Such biofuels are coal-like, and are referred to herein as "biocoal." Other types of biofuels are gaseous, liquid, or some combination of gaseous, liquid, and/or solid biofuel. The term "torrefied biomass" as used herein refers to a biomass that is torrefied—that is, heated to drive off volatile components without significantly affecting the remaining material. Torrefaction of biomass is achieved at moderate temperatures, such as above approximately 200° C. and below approximately 350° C., for example and without limitation. The gases produced as volatile components are vaporized are sometimes referred to herein as "torrefaction gases," or "torr gases." In certain embodiments, the biomass is heated to a first temperature of approximately 100° C., driving off components that are very volatile, including water, and then is heated to a higher temperature, resulting in gases having more combustible components.

It is a general feature that apparaus 100 converts a biomass to a biofuel efficiently, both from an energy and cost perspective. In certain embodiments apparaus 100 is a system that includes physical and/or chemical processes to accept a biomass at an input 101 and produce a biofuel at an output 111. Certain embodiments of apparaus 100 may also include the generation of electrical power which is generally, but not necessarily exclusively, used within the apparatus.

Apparatus 100 may further include other inputs that accept other materials that may be used in the conversion of biomass to biofuel and other outputs that are used to reject products that are not included in the biofuel. Thus for example, and without limitation, apparaus 100 may have an input 102 for accepting water, an input 103 for accepting ambient air, and an output 113 for rejecting humid air, an output 115 for rejecting gases that are either inappropriate for, or not easily included in, the biofuel, or that contain excess heat from the apparatus, an output 117 that rejects water, and an output 119 that rejects solids that do not form part of the biofuel.

In certain other embodiments, an input 105 is provided for an auxiliary fuel. The auxiliary fuel, which may, for example be diesel fuel, propane, natural gas, methane, or some other liquid or gaseous fuel, is an optional input that may be used in the system start up and/or conversion of biomass to biofuel. The auxiliary fuel may thus be used to generate electric, thermal or mechanical energy. In certain embodiments, apparaus 100 operates as a self-sustained process, not requiring auxiliary fuel. In these embodiments, an auxiliary fuel may be used during the start-up of the process, either as needed energy to start the process or to allow components obtained therein to more quickly reach temperatures that allow for the efficient operation of the apparatus. In certain other embodiments, the auxiliary fuel may include, or be replaced by, an input of electrical power, or the fuel may be the biomass or a stored portion of the torrefied product, or gasified biomass. Alternatively, an auxiliary electric power source may be used for start-up or for steady-state operation under certain conditions.

In addition, apparaus 100 may include a control system 110, such as programmable computer, that collects information from sensors, S, within the apparatus, which may include but is not limited to, devices or systems to measure temperature, pressure, gas composition, humidity, moisture content, liquid and solid levels, flow rates, biomass composition or other parameters of the process. Examples of sensors S include contact or non-contact temperature sensors, pressure sensors, gas analyzers, chemical analyzers, solids analyzers, spectral analyzers, calorimeters, humidity sensors, liquid level sensors, solid level sensors, and flow sensors. Control system 110 may also provide signals to operate and/or control actuators A, which may include but are not limited to, valves, motors, pumps, blowers and the like, within apparaus 100. Control system 110 may, for example and without limitation, control valves or flow rates to optimize the performance of apparaus 100 by, for example, ensuring that various components are operating at predetermined temperatures or pressure that allow catalysts, heat engines or heat exchanger to operate at certain conditions. Control system 110 may be physically included in apparaus 100, or may include wired or wireless connections to computers or other electronic components that are physically removed from the apparatus.

Figure 2A:
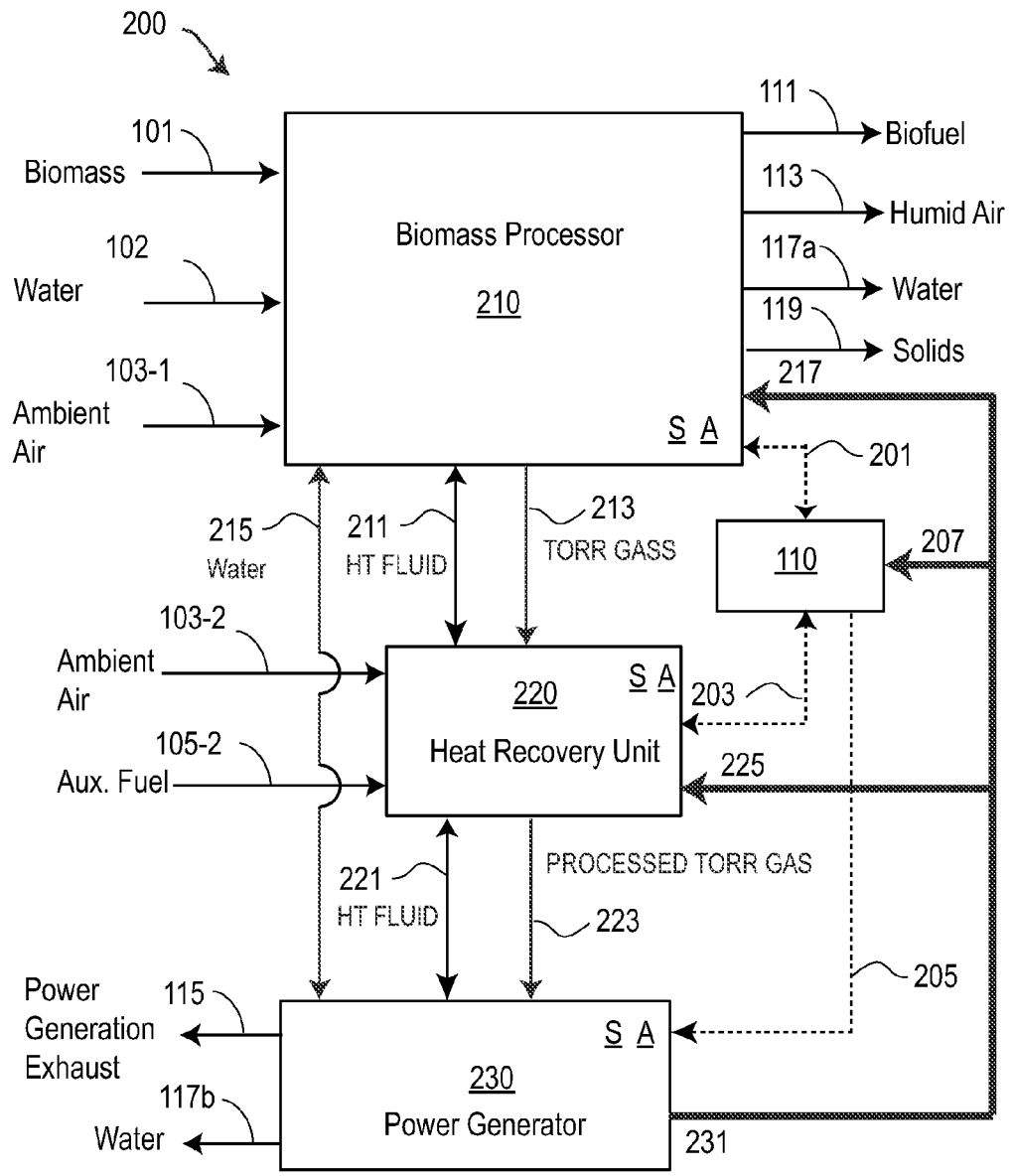
FIG. 2A is a first embodiment of a biomass-to-biofuel apparatus.
Figure 2B:
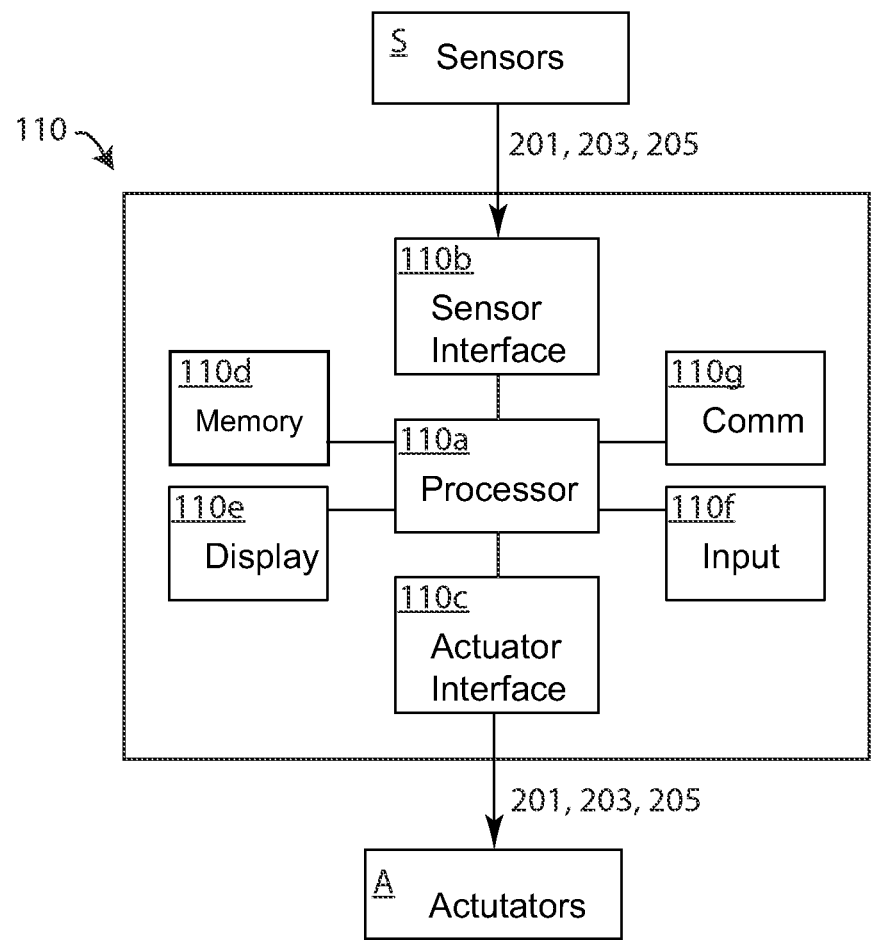
FIG. 2B is a first embodiment of a control system for the biomass-to-biofuel apparatus.

FIGS. 2A and 2B are a first embodiment of a biomass-to-biofuel apparatus 200. Apparatus 200 may be generally similar to apparaus 100, except as further detailed below. Where possible, similar elements are identified with identical reference numerals in the depiction of the embodiments of FIGS. 1 and 2.

As shown in FIG. 2A, apparatus 200 may include a biomass processor 210, a heat recovery unit 220, and a power generator 230. The names given to biomass processor 210, heat recovery unit 220, and power generator 230 are not limiting—they are meant to aid in the discussion of apparatus 200 and are invocative of possible functions. Thus, for example, one or more of processor 210, heat recovery units 220, and/or power generator 230 may include gas processing and/or heat transfer elements.

As discussed subsequently in greater detail with respect to a specific embodiment, biomass processor 210 is generally configured to have a steady-state operating condition to a) accept biomass including, but not limited to, wood, plant residues, forest trimmings, or paper residue, b) dry the biomass; c) torrefy the biomass, and d) pelletize the torrefied biomass to form a biofuel. The gases evolved from torrefaction are provided to heat recovery unit 220, and then to power generator 230 to generate electricity that is used in biomass processor 210 and heat recovery unit 220, and by control system 110.

In one embodiment, biomass processor 210 accepts biomass at input 101, water at input 102, and ambient air at input 103-1, and provides biofuel at output 111, moist air at output 113, water at output 117*a*, waste solids at output 119, and torrefaction gases at line 213. As discussed subsequently, biomass processor 210 also exchanges a heat transfer fluid 202 via lines 211 to heat recovery unit 220 and a heat transfer fluid 204 via lines 215 to power generator 230.

Alternatively, biomass processor 210 may also provide for the cleaning, washing, hydrating, and/or sizing of the biomass as appropriate for further processing.

In certain embodiments, apparatus 200 utilizes a heat transfer fluid 202 that boils in the temperature range torrefaction, such as from 200° C. to 350° C. Thus, for example, the heat transfer fluid may be mixture of biphenyl ($C_{12}H_{10}$), diphenyl oxide ($C_{12}H_{10}O$), poly-phenyls, and halogenated derivatives thereof. One such particularly useful heat transfer fluid is a mixture of biphenyl and diphenyl oxide ($C_{12}H_{10}O$) marketed as DOWTHERM™ A, (Dow Chemical Company, Midland, Mich.). DOWTHERM™ A has a boiling point of 257° C. at ambient pressure (0.1 MPa), increasing to a 355° C. at 0.58 MPa. Another heat transfer fluid 202 is a mixture of isomers of an alkylated aromatic. One such heat transfer fluid is DOWTHERM™ J, which is also manufactured by Dow Chemical Company.

This temperature range includes the temperature range of torrefaction of biomass. In the present invention, torrefaction occurs within a heat exchanger providing indirect heat transfer to boil such a heat transfer fluid, thus ensuring that the biomass temperature is controllable, via the heat transfer fluid pressure, and within the temperature range for torrefaction.

Heat recovery unit 220 accepts torrefaction gases from line 213, ambient air at input 103-2, and auxiliary fuel, when needed, at input 105-2. As discussed subsequently in certain embodiments, heat recovery unit 220 chemically reacts air from input 103-2 and torrefaction gases from line 213 to produce exhaust gases (processed torr gas) at line 223. The reaction of air and torrefaction gases is exothermic, with the heat provided to biomass processor 210 via an exchange of fluids through heat transfer lines 211 and to power generator 230 via fluid in heat transfer lines 221.

Power generator 230 accepts the processed torr gases from line 223 and produces an exhaust that is ejected at exhaust output 115. Water or other liquids may also condense from biomass processor 210 and be ejected at water output 117*b*. Power generator 230 generates electricity which is provided, via line 231 to power input 225 of heat recovery unit 220, to control system 110 at power input 207, and to biomass processor 210 at power input 217.

Apparatus 200 may include sensors S and actuators A, such as motors, and valves that are in communication with control system 110. Sensors S collect information, which may include, for example and without limitation, temperatures, pressures, material levels and flow rates, moisture content, oxygen content, carbon content, spectral information, or energy content of the biomass and/or processed biomass. Actuators A, which may include, for example and without limitation, valves, motors, pumps and blowers, may be actuated according to commands from control system 110 to enable apparatus 200 to produce biofuel from biomass. Control system 110 may collect data from sensors S and/or provide control signals to actuators A via lines 201, 203, and 205 to biomass processor 210, heat recovery unit 220, and power generator 230. Apparatus 200 may also include check valves and/or pressure relief valves that automatically operate to maintain pressures within the apparatus.

A first embodiment of control system 110 for the biomass-to-biofuel apparatus is shown in FIG. 2B. Control system 110 is the system-level computing device for controlling the apparatus 200. In certain embodiments, some or all algorithms, data storages, data processing and data communication activities for apparatus 200, including sensors S, and actuators A, are implemented by control system 110.

In one embodiment, control system 110 is a programmable computing system that may include one or more processors 110*a*, a sensor interface 110*b*, an actuator interface 110*c*, a memory 110*d*, a display 110*e*, an input 110*f*, and communications means 110*g*. Processor 110*a* is a general purpose programmable device or specialized control system. Sensor interface 110*b* accepts output signals of sensors S, actuator interface 110*c* provides control signals to actuators A, memory 110d may include instructions or data for use by processor 110a, display 110e provides information on the state of apparatus 200 and may prompt the user for input via an input 110f, such as a keyboard, mouse, touch screen, or other control inputs, and communications means 110g may be a network connection and/or a media reader receive programming or data sets for memory 110a.

More specifically, memory 110d may include control algorithms in the form of instructions for processor 110a to accept signals via sensor interface 110b and generate signals at actuator interface 110c. The information in memory 110d may also include, or be provided by communications means 110g, stored data sets that include reference or calibration data. Examples of stored data sets include, but are not limited to, calibration data to correlate sensor measurements to quantitative or qualitative physical or chemical properties, reference measurements of materials to aid in characterizing materials being measured (such as spectra of known materials), process control parameters to be applied to actuators A to control the processing of biomass of various types or conditions based on sensors S, and process control parameters to be applied to produce output biofuel product with desired material properties.

In certain embodiments, communications means 110g enables communication between control system 110 and one or more remote computers (not shown). This communication may take place via a variety of available communication technologies, including but not limited to cellular wireless systems, satellite links, wired or optical telecommunications, or combinations thereof. In situations where no fully automated communication is available, communication may be accomplished with the help of manual transferring of data on a portable data storage or computing device. The remote communication capability may be used for a number of purposes such as communicating with a remote rather than local operator, updating the local stored databases with new information, monitoring equipment function and status for maintenance or learning purposes, uploading new data or calibration data locally acquired by the system but possibly useful to other systems, uploading logged output product property measurements or process data, allowing operation or control by remote operators or remote process control algorithms, or general software or firmware updates.

In certain other embodiments, some algorithm, data storage, data processing or data communication activities on the system may be implemented remotely and communicated to control system 110 remotely via communications means 110g.

Figure 3A:
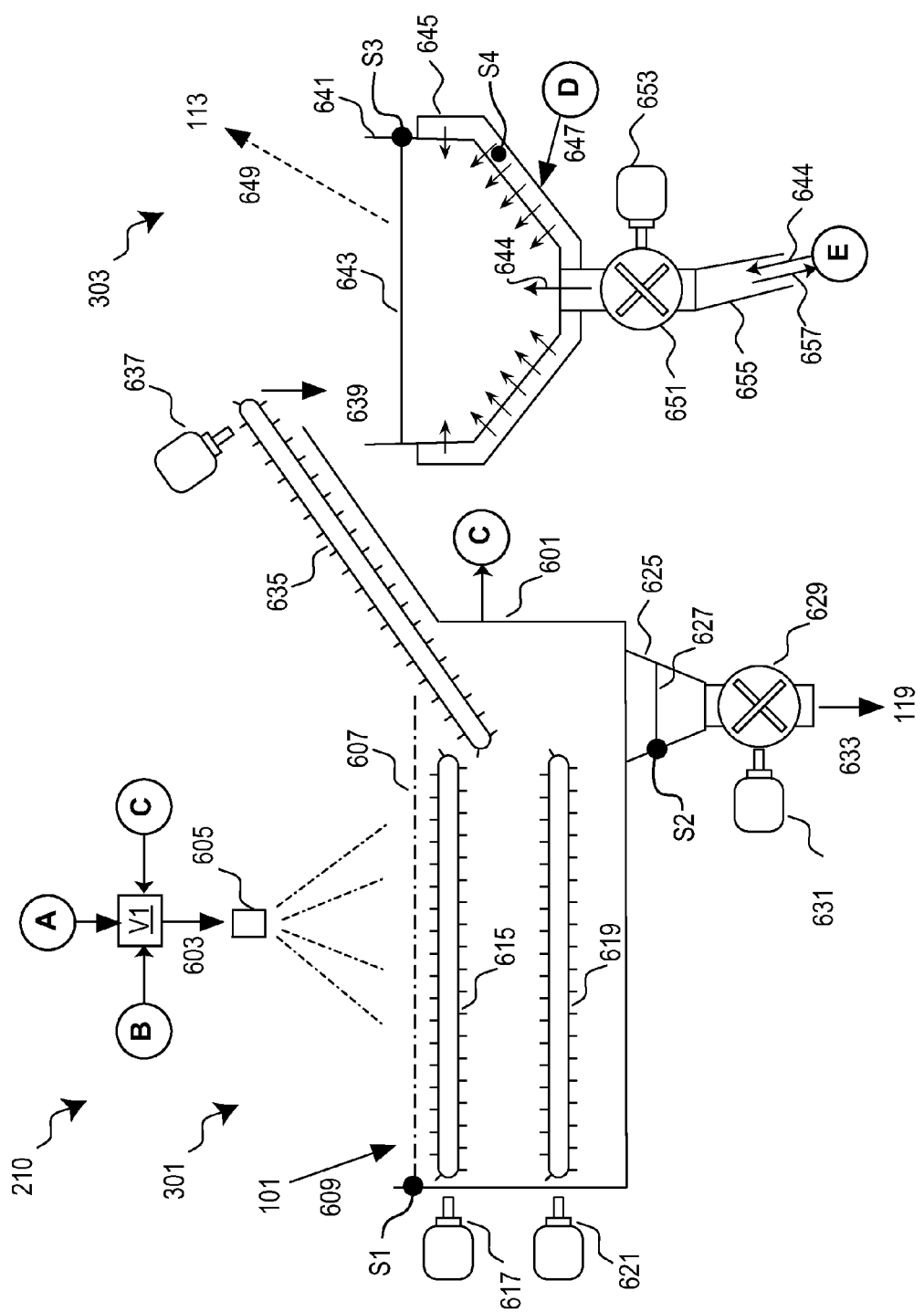
FIGS. 3A and 3B are schematics of a biomass processor of the embodiment of FIG. 2A.
Figure 3B:
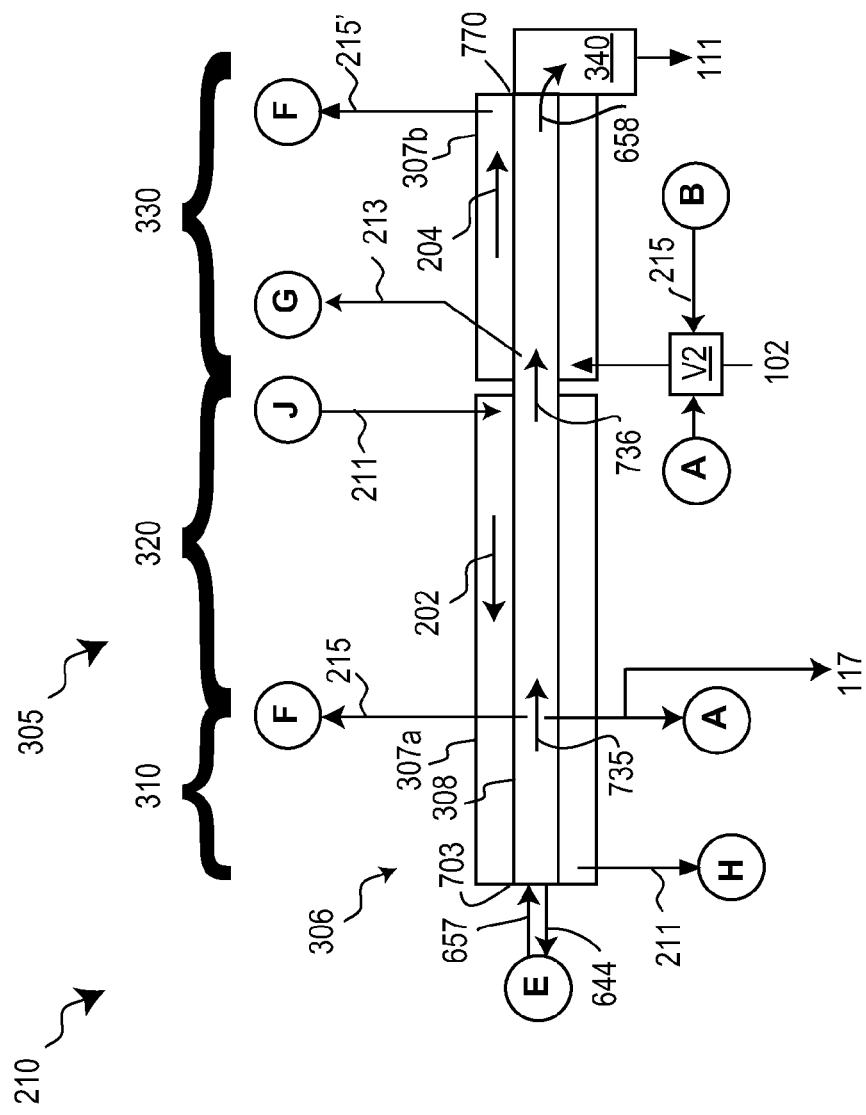

One embodiment of apparatus 200 is provided in FIGS. 3A, 3B, 3C, and 3D. Specifically, FIGS. 3A and 3B illustrate one embodiment of biomass processor 210, FIG. 3C illustrates one embodiment of heat recover unit 220, and FIG. 3D illustrates one embodiment of power generator 230. Apparatus 200 of FIGS. 3A, 3B, 3C, and 3D may be generally similar to the apparatus of FIGS. 1 and/or 2, except as further detailed below. Where possible, similar elements are identified with identical reference numerals in the depiction of the embodiments of FIGS. 1, 2A, 2B, 3A, 3B, 3C, and 3D.

In the discussion that follows, it is understood that sensors S may provide signals to control system 110, and that apparatus control elements, or actuators A, may obtain control signals from control system 110. It is understood that embodiments may have more or fewer sensors, and more or fewer control elements. For illustrative purposes, the sensors in the Figures are indicated as sensor(s) S1, S2, etc. Each "sensor(s)" may be one sensor, or may be two or more sensors. In certain embodiments, the one or more of the sensors are optional. In certain other embodiments, other sensors at the indicated locations, or at other locations, may be included.

In addition, there may be more than one control system, the one or more control systems may communicate or operate separately. Further, one or more sensors may provide information for information purposes and not affect the control of apparatus 200, and one or more process control elements may be under manual operation, or manual override of an automatic control system.

Most of the components for moving material though apparatus 200 may be controlled electrically, and thus it is understood that they may be adapted to accept control signals from control system 110 via actuator interface 110c, even in not explicitly stated herein.

Biomass processor 210 may include a biomass preparation portion 301 (as shown in FIG. 3A) a biomass metering portion 303 (as shown in FIG. 3A), and a biomass thermal processing portion 305 (as shown in FIG. 3B).

As shown in FIG. 3A, biomass preparation portion 301 may include a biomass washing tank 601 that can accept an input biomass 609 from inlet 101, and water 603 from spray nozzle 605, according to the action of an actuator A shown as water selection valve V1 and one or more pumps (not shown). Specifically, valve V1 may accept water from biomass preparation portion 301 at locations labeled "A" or "C," or from power generator 230 at the location labeled "B."

Sensor(s) S1 may include a liquid level sensor that may be used to determine the liquid level 607 in tank 601 and may be, for example and without limitation, a float switch. Water may be recirculated by drawing liquid (at position "C") from near the top of tank 601 to valve V1 using a pump (not shown). The bottom of tank 601 may include a funnel 625 connected to output 119 through a load lock 629 operated by a motor 631. Sensor(s) S2 may include a solid level sensor that may be used to determine a solid level 627 in funnel 625.

In general, any of the load locks described herein may be rotary valves, such as star valves, or may be formed from pairs of pinch valves, and may be controlled via actuator interface 110c. A rotary transfer lock may be, for example and without limitation, a PN#12rvccma1b000, manufactured by Rotolok Valves, Inc (Monroe N.C.). The pinch valves may be pneumatic RF Valves, type be4 p15-543s, manufactured by RF Valves, Inc (Columbia Md.).

Biomass preparation portion 301 also may include devices to move biomass through the portion. Thus, for example and without limitation, portion 301 is shown as having a first conveyor 615, a second conveyor 619, and a third conveyor 635 that are powered, respectively, by actuators A, such as a motor 617, a motor 621, and a motor 637.

Biomass metering portion 303 may include a hopper 641 adjacent to third conveyor 635 for accepting washed biomass 639, and a load lock 651 operated by a motor 653 that provides washed biomass 657 to chute 655. The level of material in hopper 641 may be monitored by sensor(s) S3 which may include a solid level sensor such as, for example and without limitation, an ultrasound or optical detector. Hopper 641 has a surrounding hot air plenum 645 that can accept hot air 647 from heat recovery unit 220 at "D," and inject the air into hopper 641, indicated by arrows, resulting in moist air 649 which may be provided to output 113. The pressure of plenum 645 may be monitored by sensor(s) S4, which may include a pressure sensor.

In certain embodiments, load lock 651 is air-tight. In certain other embodiments, load lock 651 permits gas to flow, even when no solids are being transferred through the lock. Thus, for example, FIG. 3A illustrates a flow of gas 644 back through chute 655, load lock 651, and into hopper 641. In yet other certain embodiments, load lock 651 may be located between conveyor 635 and hopper 641, effectively isolating the contents of the hopper 641 from air.

Alternatively, if the biomass is sufficiently clean, it may be provided directly into hopper 641 without going through biomass preparation portion 301.

Biomass processing portion 305 heats the biomass to dry and torrefy the biomass, and may optionally cool the torrefied biomass (the biofuel, or biocoal) to recover heat. As shown in FIG. 3B, biomass thermal processing portion 305 may include a heat exchanger 306. Heat exchanger 306 has a biomass transfer portion 308 that provides for transport of the biomass from an inlet 703 to an outlet 770. In addition, biomass transfer portion 308 may also provide for gases or liquids to be removed from contact with the biomass. Thus FIG. 3B shows extraction lines connected to locations "A," "F", and "G." As discussed subsequently, these lines may also include valves and, depending on the temperature and/or location in heat exchanger 306 may include liquid water, steam, or torrefaction gases.

In certain embodiments, the flow of biomass from inlet 703 to outlet 770 may reverse direction for short periods of time to agitate the biomass to facilitate heating, cooling, or aiding in providing a uniform biofuel mixture.

Heat exchanger 306 also may include one or more heat transfer fluid portions 307, illustrated without limitation as heat transfer fluid portions 307a and 307b, for providing indirect heat transfer between the biomass in biomass transfer portion 308 and a heat transfer fluid, which may be water/steam or a commercially obtainable heat transfer fluid, flowing through portion 307. Fluid in portions 307 may thus heat and/or cool the biomass at different locations in the heat exchanger by indirect contact with one or more heat transfer fluids.

In an illustrative example, FIG. 3B shows heat exchanger 306 as consisting of three heat exchanger portions: a biomass dryer 310, a biomass torrefier 320, and a biomass cooler 330. The names of heat exchanger portions 310, 320, and 330 are not limiting—they are meant to aid in the discussion of apparatus 200 and are invocative of possible functions. Thus, for example, biomass dryer 310 may not completely dry the biomass, or may at times partially torrefy the biomass. Biomass dryer 310 and biomass torrefier 320 are shown as corresponding to heat transfer fluid portion 307a, which accepts a heat transfer fluid from location "J" and provides the fluid to location "H." Biomass cooler 330 is shown as corresponding to heat transfer fluid portion 307b, accepting water from location "A," "B," or inlet 102, as directed by valve V2, and providing steam at location "F."

Heat exchanger 306 collects washed biomass 657 in inlet 703 from the location labeled "E" in FIG. 3A. Heat transfer fluids are provided to heat the biomass and biomass derived material within heat exchanger sections 310 and 320, and to cool the biomass derived material within biomass cooler 330. In biomass dryer 310, the biomass is heated to remove a substantial amount of the water and any of the more volatile gases, and is provided as a dried biomass 735 to biomass torrefier 320. In biomass torrefier 320, the biomass is further heated to form torrefied biomass 736, and to collect the remaining volatile gases. In cooling biomass cooler 330, heat is recovered from the torrefied biomass. Cooled, torrefied biomass 658 is delivered from outlet 770 is then provided to biomass compression portion 340, which provides the biomass as a biocoal product to output 111.

More specifically, heat exchanger 306 is shown illustratively as comprising a biomass transport portion 308 and one or more heat transfer fluid portions 307a and 307b. Biomass transport portion 308 accepts washed biomass 657 and moves the biomass material sequentially through biomass dryer 310, biomass torrefier 320, and cooling biomass cooler 330, while providing heat transfer fluids to maintain the reactors or heat exchangers at specified or controlled temperatures. Torrefied biomass 658 is provided at outlet 770 into a biomass compression portion 340. Biomass dryer 310, biomass torrefier 320, and cooling biomass cooler 330 thus may include one transport device or several transport devices in serial or parallel to move biomass through each heat exchanger portion 310, 320, and 330. Biomass transport portion 308 may include, but is not limited to, augers, rotary kilns, vibratory devices, or conveyors.

Heat exchanger portions 310 and 320 correspond to heat transfer fluid portion 307a, which accepts a heat transfer fluid 202 from the location labeled "J" in heat recover unit 220, provides a flow of the heat transfer fluid along those parts of biomass transport portion 308 associated with heat exchanger portions 310 and 320, and provides the heat transfer fluid to the location labeled "H" in heat recovery unit 220.

Water from the biomass in biomass dryer 310 is collected at the location labeled "A," or may be discharged through output 117. Steam from the biomass in biomass dryer 310 is collected in line 215 and provided to the location labeled "F," which is provided to the power generator 230.

Biomass cooler 330 corresponds to heat transfer fluid portion 307b, in which a heat transfer fluid 204 is water. Liquid water may be provided input 102 and/or the locations labeled as "A" or "B" in from apparatus 200 and as selected by a valve V2. After cooling the biomass, the water may be removed as steam is collected in line 215' and provided to the location labeled "F," which is provided to the power generator 230.

Torrefaction gases are collected from the biomass in biomass torrefier 320 and provided in line 213 to the location labeled "G" in heat recovery unit 220. Sensor(s) S8 measure properties of torrefaction gases, and may include but are not limited to, sensors to measure temperature, pressure, moisture content, mass flow, gas composition and energy content (calorimetry).

In certain embodiments, the biomass is processed to remove water from the biomass in biomass dryer 310 without evolving a substantial amount of combustible volatile compounds. The biomass is further processed in biomass torrefier 320 to collect combustible torrefaction gases at "G," which will then be reacted in heat recovery unit 220. In general, the volume and composition of the torrefaction gas is a function of the solid transit time through the biomass torrefier 320 and the temperature of heat transfer fluid 202. Bound oxygen is driven off (reduced) from the biomass in biomass torrefier 320 producing torrefaction gases composed of $CO_2$, $H_2O$ and $C_xH_yO_z$ volatiles. As the temperature of biomass torrefier 320 increases, or the transit time increases, more of the solids are converted to gases, thus decreasing the mass, and energy content, of the solids and increasing the mass of, and the energy content of the gases. In one embodiment, the carbon conversion ratio of the process may be a control mechanism which allows the apparatus to operate under conditions of varying biomass input characteristics. Thus by adjusting the parameters of the biomass processing (that is, the torrefaction auger speed and temperature), the fuel value of the torrefaction gases are likewise adjusted such that the fuel requirements of power generator 230 can be met.

In one embodiment, heat exchanger portions 310 and 320 are operated at the same temperature, and the feed rate of biomass is adjusted so that dried biomass 735 contains some amount of water, such as less than 15% by weight. In one embodiment, fluid 202 is provided to heat exchanger portions 310 and 320 in the temperature range of 200° C. to 350° C.

Figure 4:
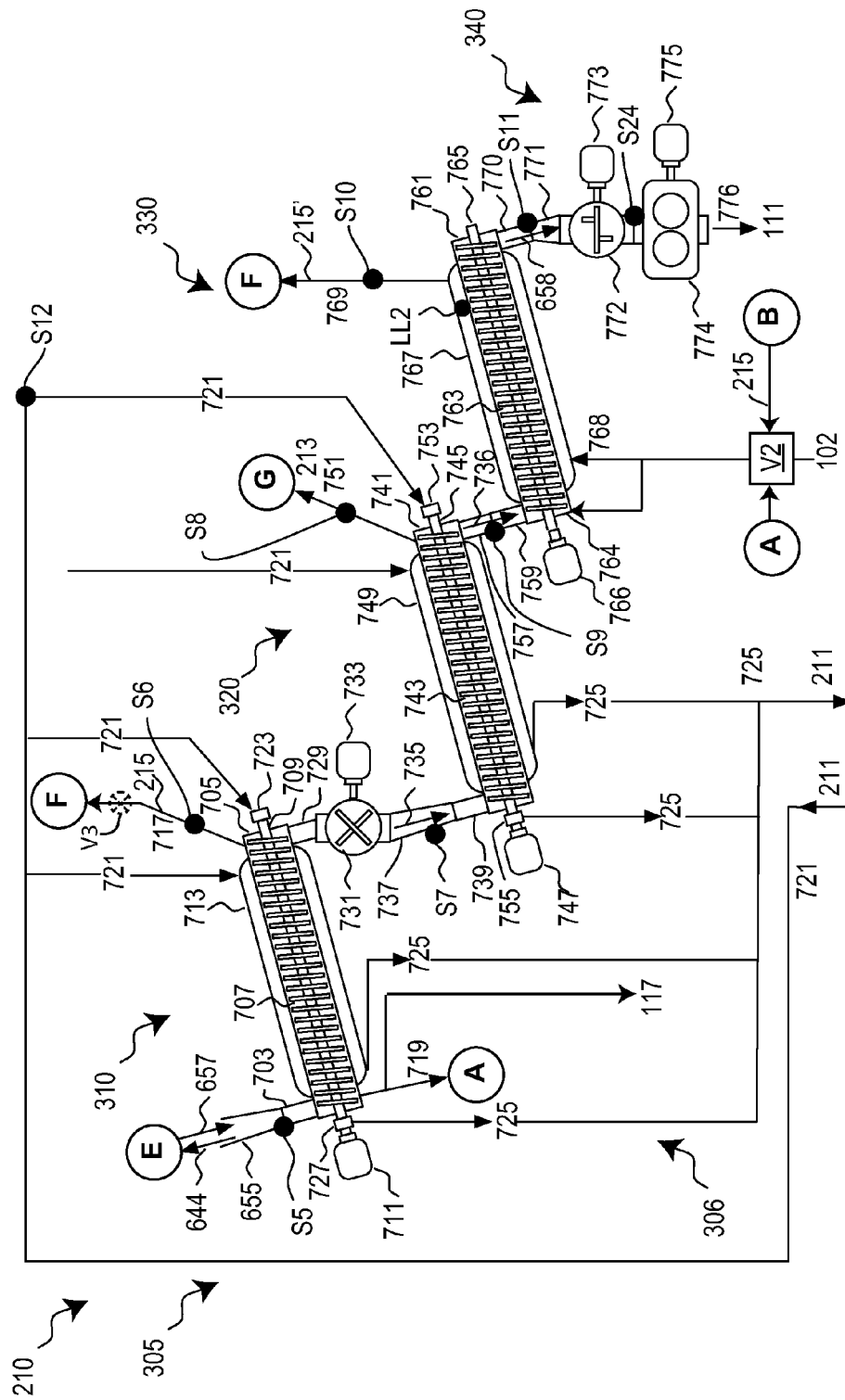
FIG. 4 is a schematic of an alternative biomass processor.

FIG. 4 is a second embodiment biomass thermal processing portion 305 and biomass compression portion 340, which are generally similar to the embodiment of FIG. 3B. FIG. 4 also shows the placement of sensors, which are particular to the specific heat exchangers.

In the embodiment of FIG. 4, biomass dryer 310, biomass torrefier 320, and biomass cooler 330 include augers that permit direct contact of the biomass with heat transfer surfaces. Biomass dryer 310 collects biomass material from the location labeled "E" in biomass dryer 310 in inlet 703, and may include sensor(s) S5, which may include: a moisture content sensor to determine the moisture content of material 657, a spectral analyzer to spectrally analyze a biomass sample, a feedstock particle size analyzer and/or a calorimeter to measure the energy content of the biomass. Biomass dryer 310 moves the material to an outlet 729 by rotating auger blades 707, which may be under the control of control system 110, and that are located within an auger housing 705. Blades 707 are mounted on a hollow auger shaft 709 controlled by a motor 711. Rotary couplings 727 and 723 are provided near inlet 703 and outlet 729, respectively, to allow a heat transfer fluid to flow through the center of hollow auger shaft 709. An auger housing jacket 713 extends along housing 705 to allow a heat transfer fluid to flow on the outside of the housing.

The output 729 of biomass dryer 310 is provided to a load lock 731 controlled by a motor 733, via control system 110, and provides dried biomass 735 through chute 737 to an input 739 of biomass torrefier 320. The moisture content of dried biomass 735 may be monitored in chute 737 with sensor(s) S7, which may include a moisture content sensor and/or a spectral analyzer to spectrally analyze a biomass sample. Biomass torrefier 320 provides the torrefied biomass to an outlet 757 with auger blades 743 that are located within an auger housing 741. Blades 743 are mounted on a hollow auger shaft 745 controlled by a motor 747 via control system 110. Rotary couplings 755 and 753 are provided near inlet 739 and outlet 757, respectively, to allow a heat transfer fluid to flow through the center of hollow auger shaft 745. An auger housing jacket 749 extends along housing 741 to allow a heat transfer fluid to flow on the outside of the housing.

The output 757 of biomass torrefier 320 may include a sensor(s) S9 which may include a temperature sensor to measure the temperature of biomass 736 from the biomass torrefier, a moisture content sensor, a spectral analyzer to spectrally analyze the biomass, and/or a calorimeter to determine the energy content of the biomass. The biomass 736 is provided to an inlet 759 of cooling biomass cooler 330, which transports the material to an outlet 770 with auger blades 763 that are located within an auger housing 761. Blades 763 are mounted on an auger shaft 765 controlled by a motor 766 via control system 110. A housing inlet 764 is provided near inlet 736 to allow a heat transfer fluid to mix with biomass 736. An auger housing jacket 767 extends along housing 761 to allow a heat transfer fluid to flow on the outside of the housing.

The cooled, torrified biomass material from outlet 770 is then provided to a chute 771, where sensor(s) S11 may include a temperature sensor to measure the biomass temperature and may include a spectral analyzer to spectrally analyze a biomass sample and/or a calorimeter to determine the energy content of the biomass. Chute 771 is an input for a grinder 772 that is operated by a motor 773, having an exit with a sensor(s) S24 may include a spectral analyzer to spectrally analyze a biomass sample, and/or a calorimeter to determine the energy content of the biomass and then to a briquetter 774 operated by a motor 775, which provides the biomass as a biocoal product 776 to output 111. Grinders and briquetters are well known in the field of wood pelletization for fuel production.

Auger housings 705, 741, and 761 correspond to biomass transfer portion 308. The center of hollow auger shafts 709 and 745, and auger housing jackets 713 and 749 correspond to heat transfer fluid portion 307a, and auger housing jacket 767 corresponds to heat transfer fluid portion 307b, as shown, for example, in FIG. 3B.

Heat transfer fluids are provided to heat the biomass and biomass derived material within heat exchanger portions 310 and 320, and to cool the biomass derived material within biomass cooler 330. In heat exchanger portions 310 and 320, a heat transfer line 721 provides fluid, whose pressure may be monitored by a sensor S12, and which is obtained from the location labeled "J" the heat recovery unit 220. Heat transfer line 721 provides the fluid to auger jacket housing 713 (which is the exterior of biomass dryer 310), rotary coupling 723 (which provides flow into the interior of the biomass dryer), auger jacket 749 (which is the exterior of biomass torrefier 320), and rotary coupling 753 (which provides flow to the interior of the biomass torrefier). Heat transfer fluid is recovered in line 725 from auger jacket housing 713, rotary coupling 727, auger jacket 749, and rotary coupling 755.

Shown in FIG. 4, water from the drying biomass is collected at auger output 719, and may be provided back to valve V1 (as indicated by the label "A"), or may be discharged through output 117. Steam from the dried biomass is collected in line 717, where sensor(s) S6 may include: a steam temperature sensor, a volatile organic compound (VOC) sensor to measure non-water components, and/or a mass flow sensor.

Also shown in FIG. 4, liquid water is used as a heat transfer fluid to cool biomass in cooling biomass cooler 330. Liquid water 768 may be provided to auger housing jacket 767 and inlet 764, where the water may be provided from input 102 and/or the locations labeled as "A" or "B" in biomass processor 210 and power generator 230, as selected by an actuator A shown as valve V2. After cooling the biomass, the water may be removed as steam 769, and sensor(s) S10 may measure the pressure and the CO and/or CO2 levels. The liquid level sensor of sensor(s) LL2 is used to ensure that the auger is filled with water to maintain the temperature of cooling biomass cooler 330.

As shown in FIG. 3C, heat recovery unit 220 may include a combustion mixer 779, a pressure vessel 784 that contains a catalytic combustor 781, a heat transfer augmenter 785, and a heat transfer tube 783, a recuperator 787, a blower 790, and valve V4.

Biomass gases obtained from biomass torrefier 320 at "G," and hot air 647, obtained from recuperator 787 via valve V4 are mixed in combustion mixer 779. In addition, auxiliary fuel may be provided to mixer 779 via input 105-2.

The output of combustion mixer 779 is a combustible gas mixture 780 measured by sensor(s) S15, which may include sensors to measure temperature, pressure, and oxygen content by a temperature sensor, pressure sensor, and oxygen sensor, respectively. The mixture is then provided to catalytic combustor 781, and combusted gases 782 flow through heat transfer augmenter and a heat exchange tube 783, where the gases exit as medium temperature exhaust gases 786. Sensor(s) S18 are located before recuperator 787, and may include a temperature sensor, a pressure sensor, a CO sensor a CO2 sensor, and an oxygen sensor.

Heat transfer fluid 202 from liquid heat transfer fluid from line 725 in biomass dryer 310 is provided to catalytic combustor 781, and heat transfer tube 783, to raise the temperature of the heat transfer fluid and return it as a vapor to line 721 ("J" in heat recovery unit 220). Sensor S17, which may include a liquid level sensor, and/or a temperature sensor, measures the level of the heat transfer fluid 202 in heat recovery unit 220. Liquid heat transfer fluid is also obtained from power generator 230 (at "K"), and vapor heat transfer fluid may also be provided to the power generation unit (at "L").

Auxiliary air from inlet 103-2 is sensed by sensor(s) S20, which may be a temperature sensor, and is provided, via blower 790, as pressurized air 788. Heat from gases 786 are provided to pressurized air 788 to form hot air 647, which is then provided to valve V4. Cooled combusted gases 789, having a temperature measured by sensor S19, leave heat recovery unit 220 in line 223.

The augers of heat exchanger portions 310, 320, and 330 of FIG. 4 are preferably sized to transport and provide sufficient heating for the biomass passing there through. Thus auger may be, for example and without limitation, of the type manufactured by Augers Unlimited (Coatsville, Pa.) fabricated of stainless steel. Thus, for example and without limitation, a throughput of 500 kg/hr may require that auger has a diameter of 12 inches (0.3 m) to 24 inches (0.6 m), a length of 10 feet (3 m) to 30 feet (10 m), and capable of operating an external pressure of 4 bars (0.4 MPa) absolute.

As shown in FIG. 3D, power generator 230 may include a heat receiver 801, a heat engine 813, a waste heat rejection system 819, a closed water loop 811 between the heat receiver and heat engine, and a closed water loop 817 between heat engine and heat rejection system. Power generator 230 utilizes the exhaust gases to generate power, as for example and without limitation, in a Rankine cycle engine, such as an organic Rankine cycle (OCR) engine model UTC 2800, manufactured by UTC Power (United Technologies Corporation, South Windsor, Conn.), or a turbine. In heat receiver 801, heat from exhaust gas 789 is accepted from "M" from heat recovery unit 220 and ejected as a colder exhaust 115, heat from vapor heat transfer fluid 721 is accepted from heat recovery unit 220 at "L" and provided back to heat recovery unit 220 at "K," and heat from steam 717 and 769 from two locations labeled "F" in FIG. 3B, and is returned as liquid water 803, to wash the biomass ("B" in biomass processing unit 210) or to output 117. In an alternative embodiment, heat receiver 801 may include a boiler to provide energy to pre heat the steam 717 or 769 as it enters the receiver. In yet another alternative embodiment, heat from steam is obtained from only one of either steam 717 or steam 769. Closed water loop 811 transfers the heat from heat receiver 801 to heat engine 813, which generate electric power provided to line 231. Closed water loop 817 transfers heat through waste heat rejection system 819 to the environment.

The temperature of water in loops 811 and 817 may be measured with temperature sensors of sensors S21 and S22, respectively. The temperature of the waste heat may be measured with temperature sensors of sensors S23.

The measurement of temperature, pressure, gas composition, humidity, liquid and solid levels, and flow rates are well known in the field, and may include, but are not limited to, contact and non-contact measurements, optical measurements (i.e. Omega OS100E infrared thermometer to measure temperature or a mid-IR or near-infrared (NIR) optical analyzer to determine gas composition), and may include measurements nearby the intended material to be measured, such as measuring a liquid temperature by measuring the wall temperature of a liquid container. Moisture content can be measured with a number of technologies including electrical resistance with probes spaced a standard distance and electrodes pressed into the product being tested and electrical inductance to accomplish a non contact measurement. One such instrument is the GE Protimeter "Survey Master" Manufactured by General Electric and which includes both of these technologies. Another non contact measurement method is using mid-IR beam reflection, such as the IR5000 manufactured by GreCon in Tigard, Oreg.

Spectral Measurements

Certain embodiments include spectral measurements of materials, which may be used to quantify or qualify the material. Thus, for example, the spectral characteristics of a material in apparatus 200 may be compared to spectral characteristics of one or more known materials as a means of identifying materials or controlling the apparatus. Alternatively, spectral measurement may be calibrated to quantify the measurement, and/or spectroscopic models may be used extract useful information from spectral measurements.

The terms spectroscopy, spectral or optical spectroscopy as used herein refer to any type of measurement or probing of a material properties using light or electromagnetic radiation ranging from what is known in the art as the deep ultraviolet spectrum through visible light, NIR, mid-IR and long wavelength infrared and terahertz waves. This includes, but is not limited to, measurements made on the transmission, absorption, reflection or scattering of light by materials. This includes but is not limited to methods know in the art as visible, colorimetry, mid IR, near IR, far IR, terahertz, photoacoustic and Raman spectroscopy, in combination with light sources of various types either broad-band or narrow-band, dispersion or wavelength selection methods including diffraction gratings, prisms, discrete filters, acousto-optic filters, narrow-band or tunable light sources, interferometers or Fourier transform (FT) techniques (FTIR, FT-NIR, FT-Raman), light detectors of various types known in the art and appropriate for the wavelength range of interest and including spatial detector arrays, and sample interface methods including attenuated total reflection (ATR), diffuse reflectance, specular reflectance, transmission mode, use of KBR pellets, thermal gradient spectroscopy, and many other techniques known in the art.

Figure 5:
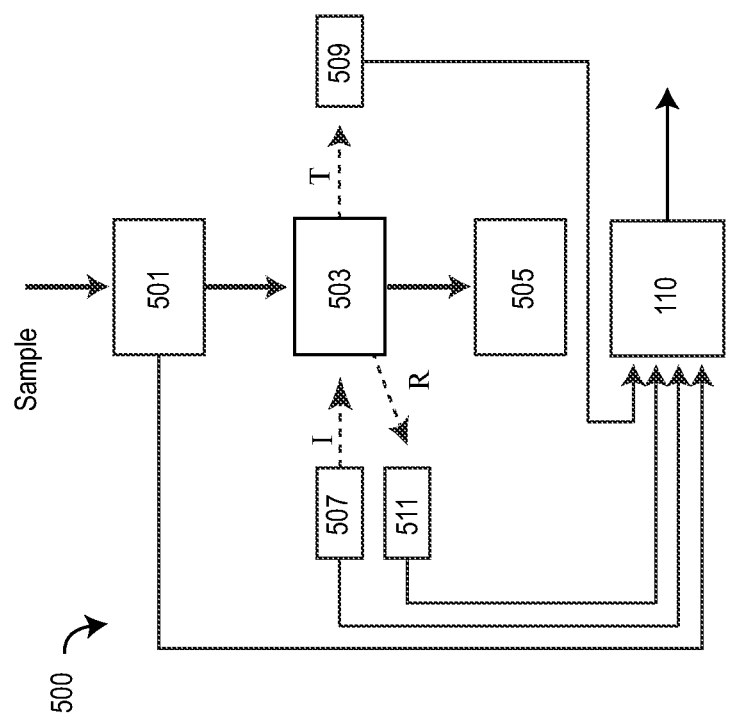
FIG. 5 is a schematic diagram of one embodiment of a spectral analyzer.

FIG. 5 is a schematic diagram of one embodiment of a sensor that is a spectral analyzer 500. Analyzer 500 may, for example, operate at visible, mid-IR, or IR wavelengths, and may operate at discrete wavelengths or over ranges of wavelengths. Spectral analyzer 500 may, for example, include a light source 507, a detection mechanism(s) 509 and/or 511, and a dispersion or other wavelength selection mechanism (not shown, but which may be within the optical path associated with light source 507, and/or or detectors 509 and/or 511 either before or after the sample interface 503). Examples of these spectral analyzer components and combinations thereof include mid-IR FTIR spectrometers (wavelengths from approximately 2.5 to approximately 30 microns, visible (wavelengths from approximately 390 to approximately 700 nanometers) or near infrared (wavelengths from approximately 0.7 to approximately 2.5 microns) spectrometers, Raman spectrometers, photo-acoustic spectrometers, and a variety of other instruments known in the art.

Analyzer 500 accepts some or all of a sample from apparatus 200 into preparation unit 501. Preparation unit 501 may, for example, include a grinder to prepare the sample for measurement, or permit a continuous flow of material.

The sample then passes into the sample interface 503 which accepts light from light source(s) 507 and collects transmitted light using detector(s) 509 and reflected light using detector(s) 511. Sample interface 503 is the physical configuration and process in which the sample is probed. For example a mid-infrared FTIR spectral analyzer may probe samples with a reflection interface, an ATR interface, or a variety of other techniques known in the art.

The sample then passes into sample receiver 505 which may return the sample to apparatus 200, or recycle the material. Control system 110 controls light source(s) 507 and collects data from sensor(s) 509 and 511, and stores and/or uses the measurements to deduce information about the sample. In certain embodiments, analyzer 500 includes only a reflectance measurement.

Alternatively, sample receiver 505 may store samples for later analysis, and control system 110 marks the sample with information that can later identify the sample.

In an alternative embodiment the analyzer 500 may not include a separate preparation unit 501 or the sample receiver 505, and the sample interface 503 may be built into a material flow path of the apparatus 200, such that the sample material does not need to be extracted from the process material flow.

Spectral analyzer 500 may include a dedicated processor or have control system 110 process data. The processing generally includes subtracting background signals or zeroing the data, scaling or normalizing the data if needed, converting the data into absolute or differential optical intensity, absorption, transmission, reflection or other optical or optical detection signal parameters vs. wavelength, or other optical signal processing techniques that are know in the art.

Figure 6:
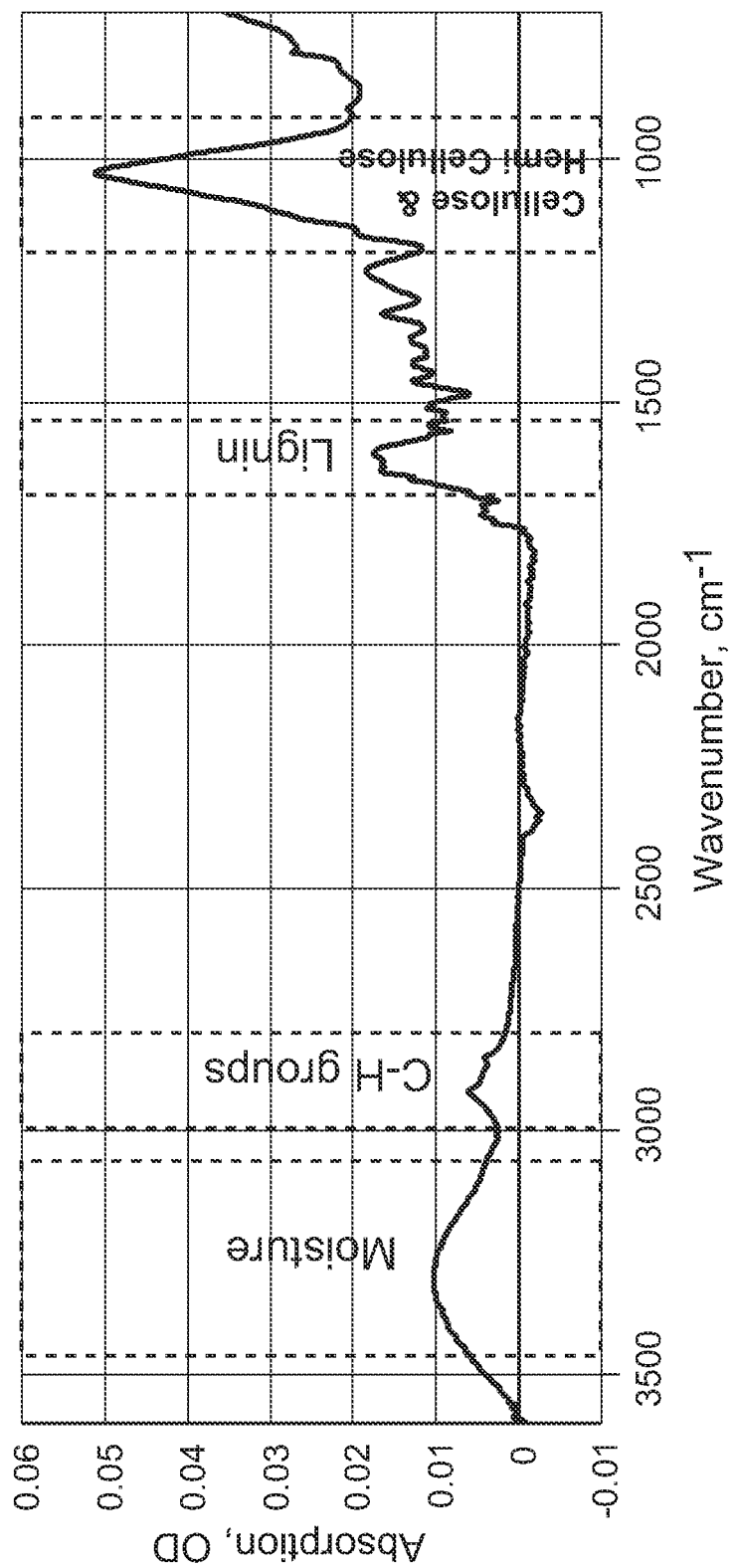
FIG. 6 is a Fourier transform infrared spectroscopy (FTIR) spectra of a biomass sample, highlighting absorption bands of several chemical bonds of interest in the torrefaction of woody biomass

While other wavelengths may be used to characterize the chemical bonds of woody biomass, FIG. 6 is an FTIR scan, using ATR technique, of a biomass sample, highlighting the absorption bands of several chemical bonds of interest in the torrefaction of woody biomass. Chemical bonds absorb infrared energy at specific wavelengths, and thus the absorption spectrum can be used to identify and quantify such bonds. Specific bands of value in analysis of woody biomass are shown in FIG. 6. The monitoring of absorption at specific wavelengths provides an indication of the progress of the torrefaction process. If not enough bonds are broken, i.e. Absorption is too high, the process parameters need to be adjusted to provide more torrefaction. Such adjustments include increasing torrefaction temperature, time in the torrefaction reactor, and/or decreasing load size. This adjustment can be done by monitoring (for example the mid IR absorbance at specific wavelengths) of the output product or by monitoring both the input biomass and output product.

One advantage of measuring the input biomass absorption spectra is that changes in input biomass can be detected and process control adjustments made preemptively rather than reacting only to the output product. Both methods may be practiced by various embodiments of the present invention.

Unlike many laboratory processes, spectroscopy is well suited to an automated real time process. For instance the use of the ATR sampling technique allows the IR Spectroscopy system to be integrated with the process flow system.

The conversion of spectroscopic information to physical or chemical information about the properties of the material being measured typically involves a calibration. Some of these techniques are described in the following Examples. Thus, for example, spectroscopic information may be obtained on reference materials, or information independently obtained (such as energy content or elemental composition) may be stored with spectroscopic information or calibration constants to permit a spectroscopic technique to rapidly provide computed material property information on biomass or partially or fully torrefied biomass. Such calibration information is stored in control system 110.

An example of a calibration process is as follows. It can be performed on the actual sampling and measurement apparatus used in the process, or alternatively on a standard apparatus through the well know technique of cross calibration.

1) A representative group of feedstock samples are measured in their raw state (in the spectrometer apparatus), after drying to 10% moisture content. This produces an array of FOD(n, input), where FOD denotes a spectroscopically measured parameter and n denotes an index of the measured wavelengths.
2) The same feedstock samples are measured on a calorimeter to produce a vector of FC(input), the Btu/pound values.
3) These feedstock samples are processed through a variety of operational parameters, for instance three temperature settings and three dwell time settings, to produce an array of output product samples.
4) These output product samples are measured in the spectrometer apparatus. This produces an array of FOD(n, output, process setting).
5) The same output product samples are measured on a calorimeter to produce a vector of FC(output, process setting), the output Btu/pound values.
6) This input and output data is then used to provide a correlation which, for example, may be provided by a regression FC against FOD, to produce the calibration vectors for computing BTU/pound based on measured spectral data, which are then stored in memory.

A calibration to other parameters, for instance an elemental analysis curve (sometimes referred to as a van Krevelen diagram) is accomplished in a similar fashion as the BTU calibration. In the case of elemental analysis the reference value may be generated by a laboratory elemental analysis instrument such as The Perkin Elmer 2400 Series II CHNS/O System.

EXAMPLE 1

Indication of Fuel Energy Content by Visible Light Colorimetry

It has been observed that the color of fuel obtained by apparatus 200 is qualitatively indicative of the energy content of the product. The following procedure was followed to obtain a quantitative measure of the energy content of the biofuel from visible light spectroscopy.

Four samples of mixed woods were obtained, and three of the samples were torrified at varying the torrefaction temperature: 270, 285 and 300° C. Representative samples were measured at a commercial laboratory (HAZEN Laboratories, Golden, Colo.) to determine the BTU/lb Caloric Value (Cv). Samples were also measured by visible light spectroscopy and, as shown subsequently, a high degree of correlation was obtained between spectral and laboratory measurements. It may thus be possible to estimate the energy content of material within apparatus 200 by a simple and rapid visible light spectroscopic analysis.

A reflectance technique was used to spectroscopically measure the sample. Specifically, the color of the samples was determined using a commercial color sensor (model OPB780Z, manufactured by OPTEK, Carrollton, Tex.). The device illuminated the sample with a broad spectrum (white) visible light LED and measured the reflected light. The reflected light was measured in 4 different channels, each consisting of filters for red (center wavelength=605 nm), blue (center wavelength=480 nm), green (center wavelength=545 nm) and one "clear" channel with no color filter (covers red, blue, and green, with a wide band-pass window centered at 530 nm). The data for each sample was analyzed by forming the following three ratios:

R1=Blue/Clear
R2=Red/Clear
R3=(Red+Blue+Green)/Clear

A linear regression of the values of R1, R2, R3, and BTU was then performed according to the following equation: Energy (BTU/pound)=Coefficient_1*R1+Coefficient_2*R2+Coefficient_3*R3+Constant. And the following parameters were found for the particular torrefied wood samples: Coefficient_1=265.03; Coefficient_2=−207.93; Coefficient_3=−306.86; and Constant=−63.56. The resulting regression coefficient, $r^2$, was greater than 0.997, indicating that visible light spectroscopy/colorimetry may be used to estimate the energy content of torrefied wood. The results of the regression may be used to provide a correlation of the spectroscopic measurements to obtain an estimate of the caloric value of the torrefied biomass.

EXAMPLE 2

Estimation of the Molar Ratio of C, H, and O by Spectroscopy

One common metric of the quality of a solid fuel is by elemental composition ratios, such as the elemental ratio of oxygen to carbon (O/C) and the elemental ratio of hydrogen to carbon (H/C).

Figure 7A:
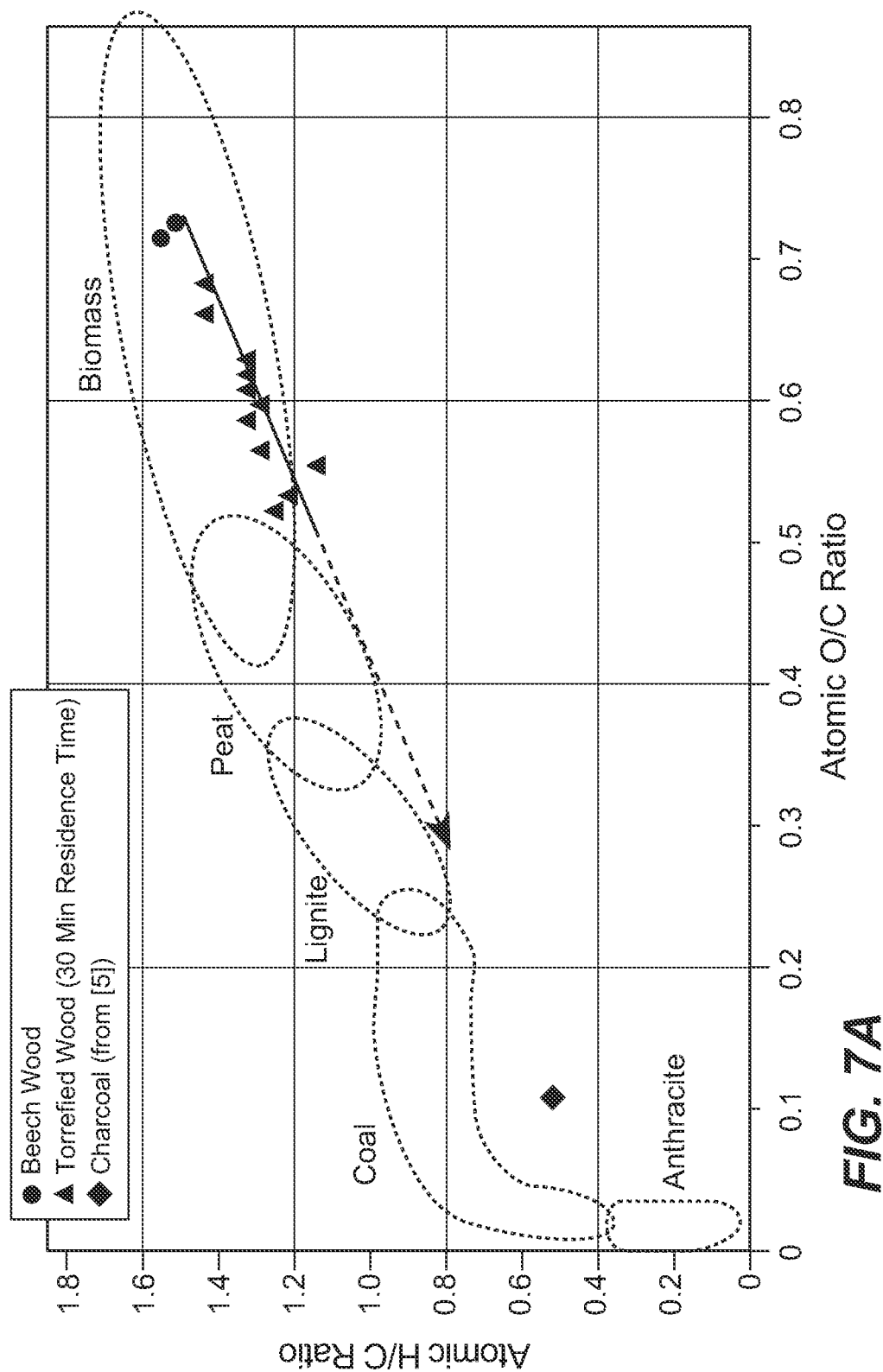
FIG. 7A is a graph of the ration of oxygen atoms to carbon atoms (O/C) and hydrogen atoms to carbon atoms (H/C) for several types of fuel.

FIG. 7A is a graph of the ratio of oxygen atoms to carbon atoms (O/C) and hydrogen atoms to carbon atoms (H/C) for several types of fuel. This type of graph is often referred to as a "van Krevelen diagram." See, for example, "Graphical-statistical method for the study of structure and reaction processes of coal", *Fuel*, 29, 269-84 (1950).

Different types of fuel appear in different areas of a van Krevelen diagram. As shown in FIG. 7A, raw biomass appears in the upper right corner, natural coal is near the lower left corner and the shown samples of torrefied wood are between the two. The action of torrefaction of biomass changes the chemical structure of the biomass, causing the O/C and H/C ratios to move from the upper right portion of FIG. 7A toward the lower left portion of the figure. In control of a Torrefaction system it would be beneficial to know where the input and output product are located on a van Krevelen diagram, in real time.

Typically, measurements necessary to place a sample on a van Krevelen diagram require the laboratory determination of molecular ratios of the sample by elemental analysis. Laboratory elemental analysis was applied to the same representative samples described in the previous Example 1, and the measured O/C and H/C ratios are shown in FIG. 7B, which is the graph of FIG. 7A including data for torrefied wood.

Figure 7B:
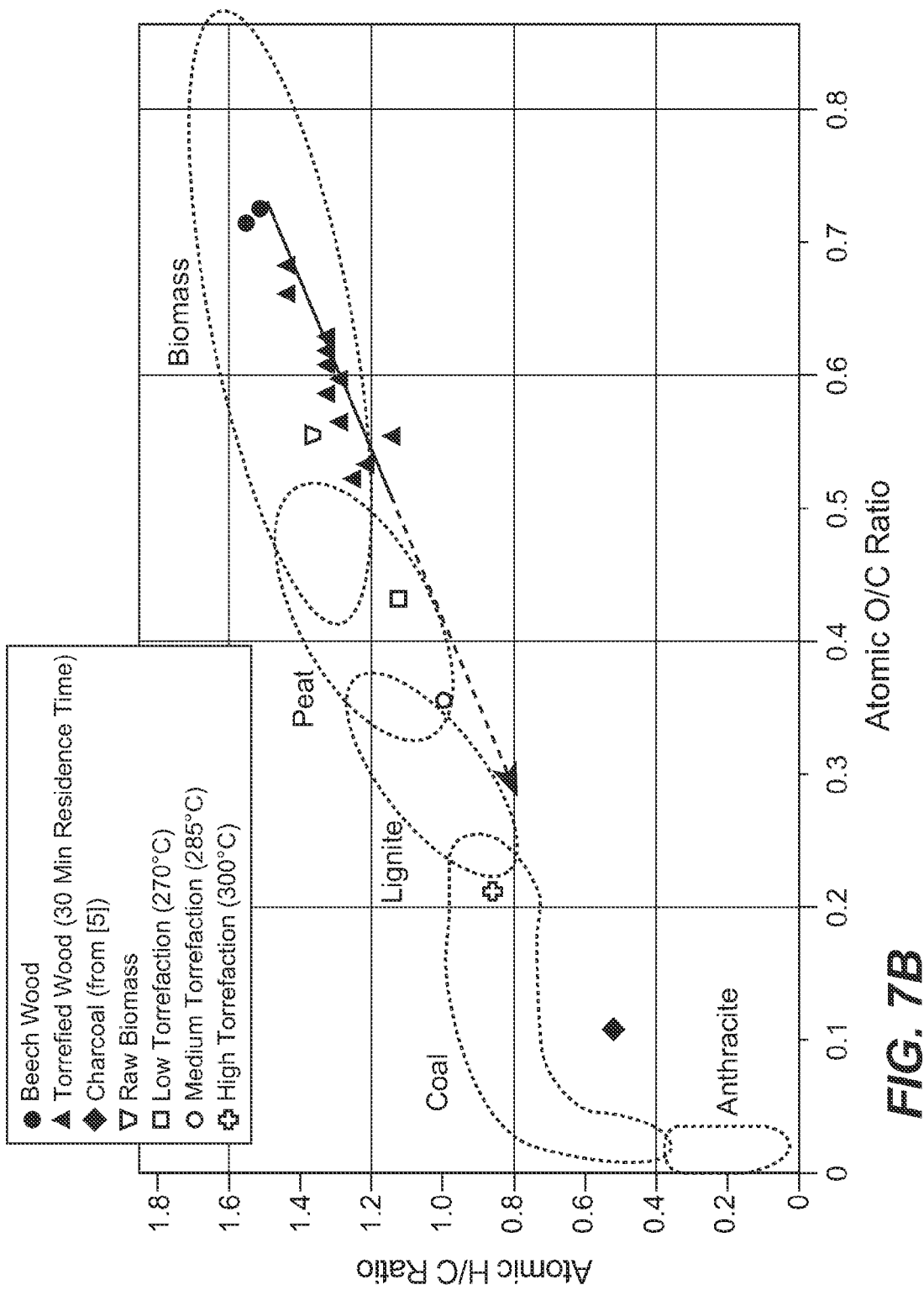
FIG. 7B is the graph of FIG. 7A including data for torrefied wood.

Of particular importance in FIG. 7B is the location of the raw biomass towards the upper right hand portion of the figure, and that the torrefied biomass moves towards the lower left portion of the figure as it is torrefied with increasing process temperature, spanning a broad range of values on the van Krevelen diagram. FIG. 7B includes data for raw biomass (trapezoid symbols), low torrefaction (270° C.) (square symbols), medium torrefaction (285° C.) (circles), and high torrefaction (300° C.) (cross symbols).

The following example illustrates placement of samples on the van Krevelen diagram by mid IR spectroscopic techniques (which measure the type and amount of molecular bonds in a sample) calibrated to estimate the elemental ratios H/C and O/C. This allows for a determination of the quality of the biofuel and can also permit the control of apparatus 200 using such measurements.

Figure 8:
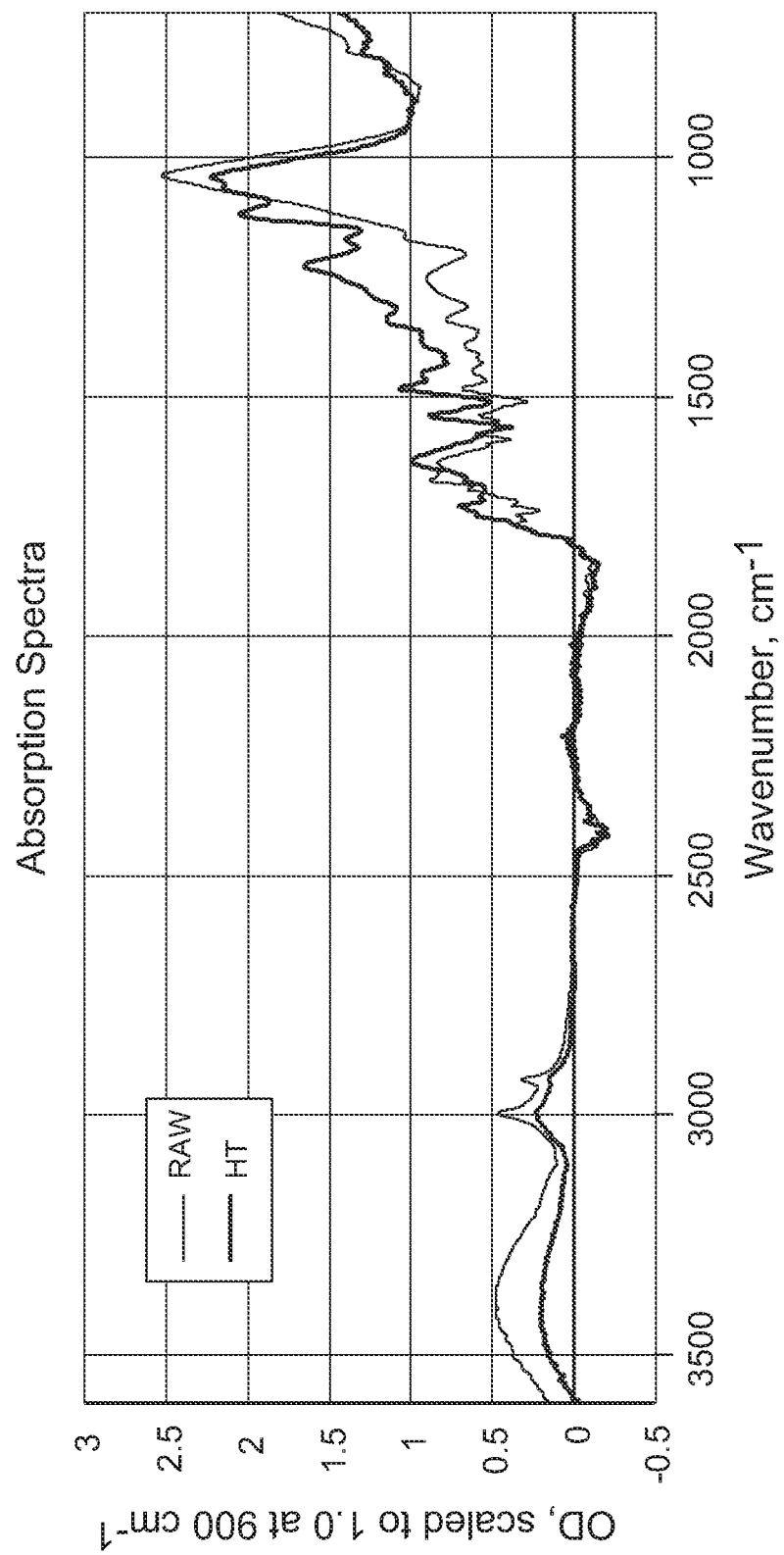
FIG. 8 shows FTIR spectra for samples with various levels of torrefaction.

Again using the samples described in the previous Example 1, a Perkin Elmer System 2000 FTIR equipped with an ATR (attenuated total internal reflection module) was used to obtain data. FIG. 8 shows FTIR spectra for samples with various levels of torrefaction, including RAW (untorrefied) and after exposure to Hi Torrefaction (long time and high temperature).

Spectra were obtained in 4 wavelength bands: R1=Absorbance at 3100-3500 $cm^{-1}$; R2=Absorbance at 2800 to 3000 $cm^{-1}$; R3=Absorbance at 1550 to 1700 $cm^{-1}$; and R4=Absorbance at 900 to 1175 $cm^{-1}$. The measured spectra were then correlated with measured elemental analysis. It was found that the best correlations for H/C and O/C for the samples were obtained with the R1 measurement, which gave an $r^2$ value of 0.970. Band 1 (R1) spectroscopic data was chosen for regression, and for our samples we found the regression parameters to be:

H/C=2.629*R1+0.475
O/C=1.722*R1−0.022

Figure 9:
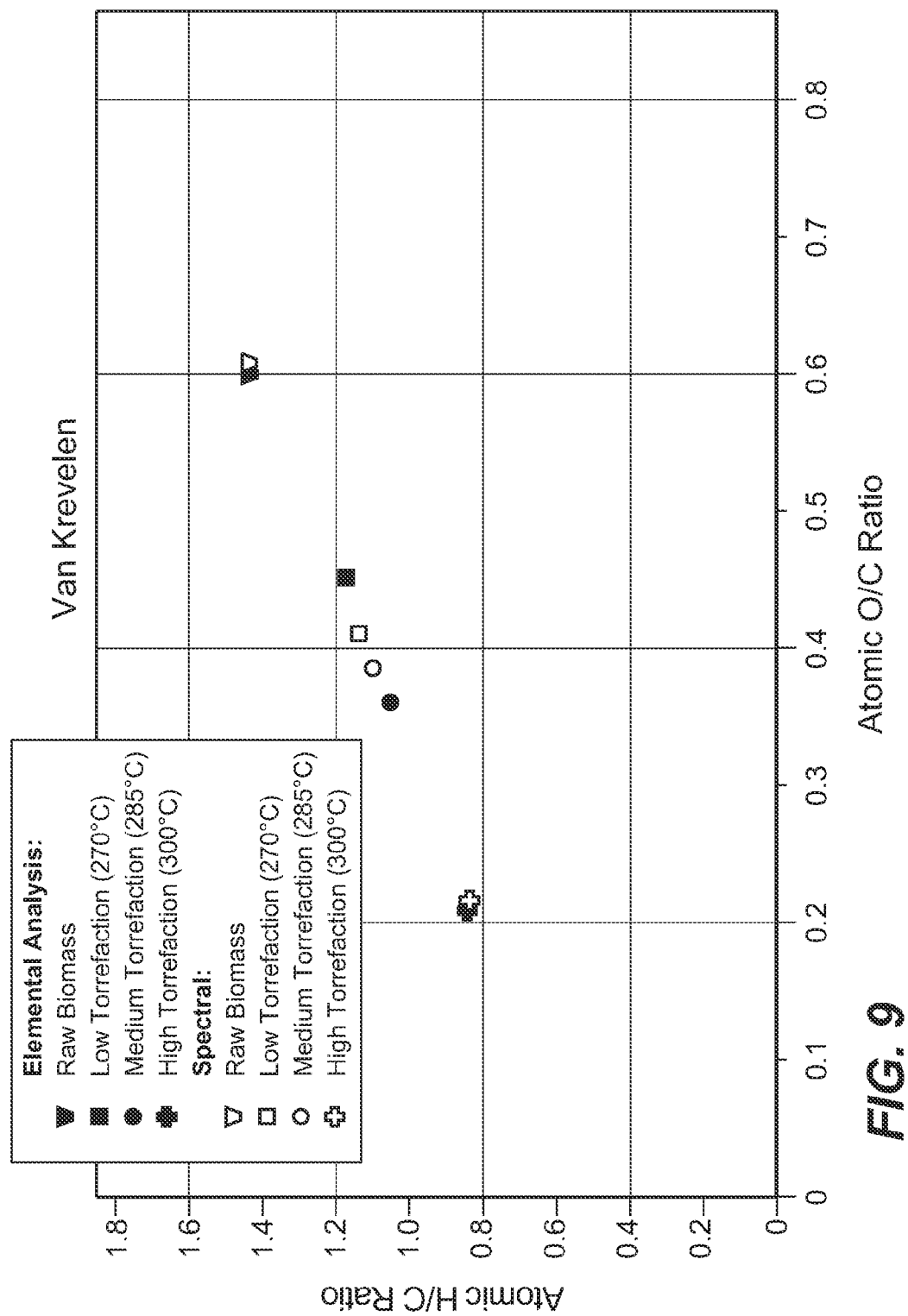
FIG. 9 shows H/C and O/C values for several samples of biomass, where the values are obtained from elemental analysis and from a correlation of H/C and O/C obtained from a mid-IR spectra.

FIG. 9 shows H/C and O/C values for several samples of biomass, where the values are obtained from elemental analysis (filled symbols) and from a correlation of H/C and O/C obtained from a mid-infrared single wavelength band and linear regression (mid-IR) (open symbols), for raw biomass (trapezoid symbols), low torrefaction (270° C.) (square symbols), medium torrefaction (285° C.) (circles), and high torrefaction (300° C.) (cross symbols), as shown on a van Krevelen diagram. The results of the regression may be used to provide a correlation of the spectroscopic measurements to obtain an estimate of the H/C and O/C ratios of the torrefied biomass.

In other implementations, improved estimations may be achieved by the use of larger calibration or training data sets, more sophisticated regression techniques, calibrating each of the two van Krevelen dimensions against measurements from more than one spectral band, or by other calibration and estimation techniques known in the art.

EXAMPLE 3

Indication of Fuel Energy Content by Mid-IR Spectroscopy

The FTIR spectral measurements of Example 2 were also regressed against the energy content of each sample, similar to what was described with visible light colorimetry in Example 1. It was found that the following regression parameters provided a very good indication of the energy content of the samples, on par with the accuracy of the Example 1: BTU/pound=(−18447*R1)+13767.

Thus either visible light or mid-IR spectroscopy may be used to rapidly estimate the energy content of biomass for a range of levels of torrefaction.

Since the data samples used to obtain the BTU correlation is with a limited number of samples, it not yet know if these results are "universal" or if different correlation constants must be stored in control system 110 to control the processing of different materials.

EXAMPLE 4

Determination of Contamination of Biomass

Figure 10:
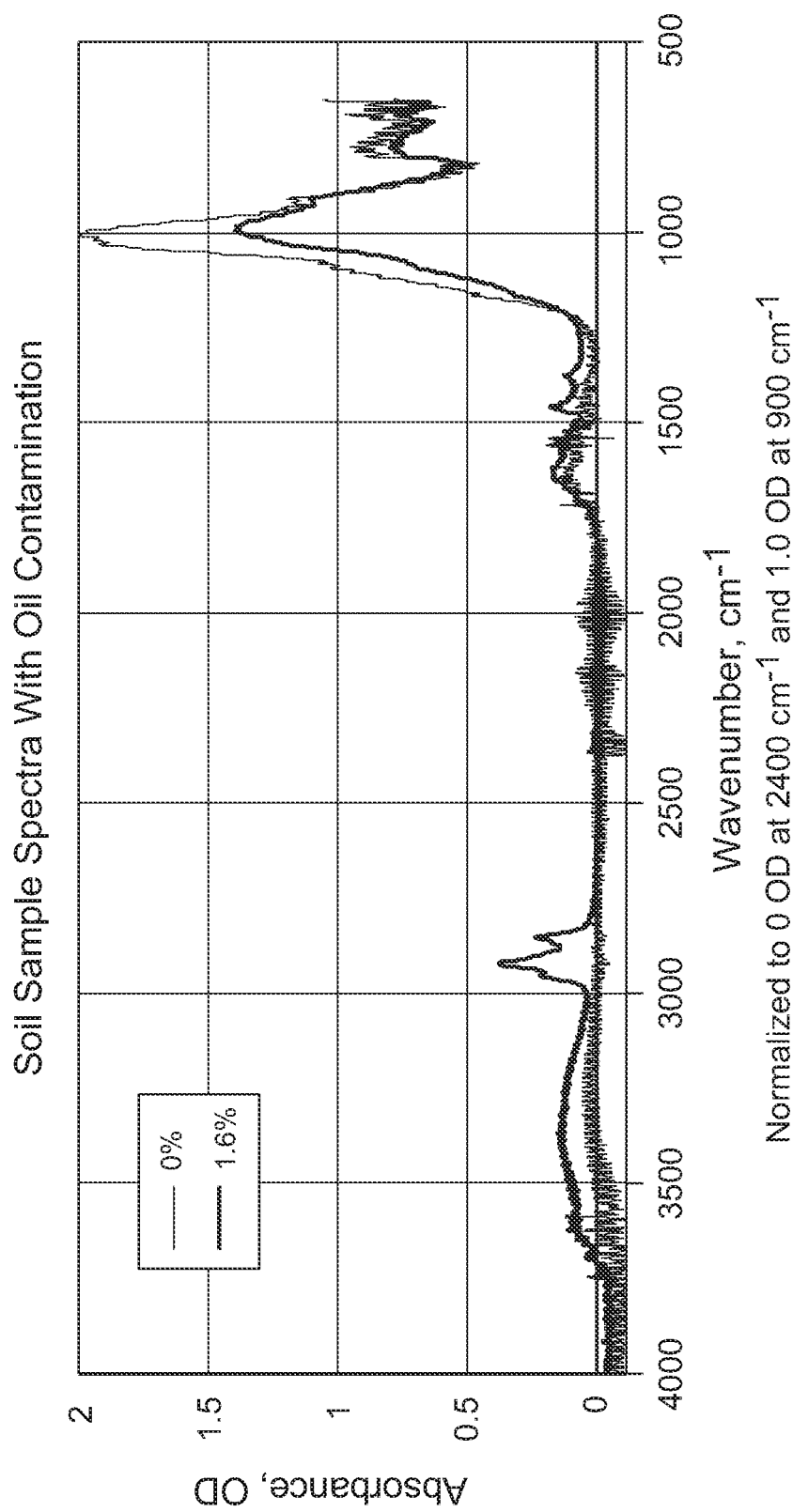
FIG. 10 shows an FTIR spectrum for an uncontaminated soil sample and a soil sample contaminated with 1.6% by weight of oil.

In some circumstances, the biomass may be contaminated. This may affect the torrefaction or other processing of the biomass, and may also affect the ability of spectroscopy to control the process. FIG. 10 shows the spectra, obtained by the FTIR system described above, for an uncontaminated soil sample and a soil sample contaminated with 1.6% by weight of oil.

The ability to detect contamination is important in remote site torrefaction to prevent contaminated materials from being processed that would distort or make the output biomass unusable or in a worst case may damage the torrefaction reactor. Contamination of soil with oil can occur where, for instance, diesel power equipment is used. It is clear that the oil presents spectroscopically, for example near 3000 cm$^{-1}$, and thus a spectroscopic system could also measure at and near this, or some other wavelength, to determine the presence and concentration of contaminants.

Operation of the Apparatus

The material flow rates and temperature of the components of system 200 are preferably operated to: 1) minimize the amount of volatile components (with the exception of water) recovered from biomass dryer 310; 2) minimize the amount of water recovered from biomass torrefier 320; and 3) generate enough electric power in the power generation unit to operate the system.

Minimizing volatile components recovered from biomass dryer 310 and minimizing the amount of water recovered from biomass torrefier 320 may be accomplished in a number of ways. Thus, for example and without limitation, load locks positioned at different stages in system 200 may isolate the drying, torrefaction, and cooling portion from the biomass inlet and biofuel outlet. Gases extracted from these stages may thus be substantially partitioned between steam and torr gases. Additionally, or in place of the load locks, steam and torr gas extraction locations may include valves to control the exit of steam and torr gas from system 200.

Thus for example, steam generated by the biomass in transport portion 703 prevents torr gas from flowing upstream from torrefier 320, and providing the torr gas to line 213. In addition, the steam thus generated may flow further upstream, essentially purging air from the biomass, and providing a "self-purging" system. Further, water added to biomass cooler 330 may also generate steam, further isolating the torr gases to torrefier 320 for extraction at line 213.

As an example of the operation of apparatus 200 of FIGS. 3A, 3B (or 4), 3C and 4D, raw biomass may be loaded into input 101 of biomass preparation portion 301, and provided to tank 601. Preferably, the biomass is provided at a nearly constant rate. A spray of water is provided through nozzle 605, where the water is either obtained from biomass dryer 310 ("A"), power generator 230 ("B"), or by recirculation from tank 601 ("C") according to the selection of valve V1, where the water is provided to maintain a constant level as indicated by sensor S1.

As solid material settles in tank 601, sensor S2 indicates when motor 631 needs to be operated to discharge the solids to output 119.

Motors 617, 621, 631, and 637 and valve V1 are thus operated by control system 110 utilizing the output of sensors S1 and S2 to provide the correct water level and solids level, to move biomass and solids through tank 601, and to provide biomass into biomass metering portion 303.

In biomass metering portion 303 the biomass is partially dried using a stream of hot air provided to hopper 641. In the embodiment of FIG. 3A, the pressure of hot air is monitored by sensor S4, and is controlled by blower 790 and valve V4, which directs hot air into hopper 641. If the pressure at sensor S4 is insufficient to flow through the biomass, then valve V4 may direct more flow towards hopper 641, and/or the blower may be operated to provide a higher pressure.

In general, the moisture content of biomass 657 varies with feedstock location, age and weather. System 200 may be controlled to accommodate these changes.

Since the torrefaction of biomass is best done in the absence of oxygen, biomass 657 leaves biomass metering portion 303 through lock 651 operated to prevent air from entering heat exchanger portions 310 and 320. Thus, for example, the biomass within heat exchanger portions 310, 320, and 330 may be at an elevated pressure, such as from 0.11 MPa absolute to 0.3 MPa absolute. Water evolving from biomass dryer 310 and torrefaction gases evolving from biomass torrefier 320 will pressurize the heat exchangers. Load locks at the ends of heat exchanger portions 310, 320, and/or 330, coupled with valves on outgas lines from the heat exchanger, will permit the separation of the various gases.

In one embodiment, steam 644 that leaves the drying biomass flows back into hopper 641, purging any air contained in the biomass before it leaves the hopper.

In certain embodiments, heat exchanger portions 310 and 320 are operated to obtain torrefaction gases, which are then used to generate electricity for operating system 200. It is thus important that the quality and quantity of torrefaction gas obtain from biomass torrefier have sufficient chemical energy. In one embodiment, heat exchanger portions 310 and 320 are operated at the same temperature, as provided by the saturation temperature of the heat transfer fluid in lines 721 and 725 at the pressure measured at sensor P12 (not shown). This fluid is provided to both the inside and outside of heat exchanger portions 310 and 320, and may be at a temperature of between 200° C. and 350° C. The temperature of fluid provided to heat exchanger portions 310 and 320 may thus, for example, be approximately 200° C., approximately 225° C., approximately 250° C., approximately 275° C., or approximately 300° C., or approximately 325° C., or approximately 350° C.

Thus, for example, if there is some amount of moisture in the biomass as it leaves biomass dryer 310, one may be assured that evaporation of liquids less volatile than water has not occurred within the biomass dryer. An initial drying of the biomass takes place in dryer 310 through the phase change fluid of heat transfer fluid 202 at a constant temperature, for instance 300° C. Biomass 657 with a moisture content of up to 60% on a wet basis leaves dryer 310 as biomass 735, with a moisture content of 10% to 20% on a wet basis. The moisture leaves as steam 717 or liquid water 719.

The biomass within dryer 310 may be, for example and without limitation, near at ambient pressure, with the steam nearly saturated at 100° C. In one embodiment, the output of sensor S6 is monitored, and the speed of motor 711, and thus the flow of biomass through the biomass dryer, is adjusted to maintain a moisture content of from 10% to 25%. from 15% to 20%, or to be approximately 10%, 15%, 20% or 25%. If the moisture content is too high, then control system 110 may slow down motor 711 to provide more drying, while if the moisture content is too low, then control system 110 may speed up motor 711 to provide less drying.

In certain embodiments, electric power from power generation unit 230 may be maximized or controlled by adding water directly to the biomass in the dryer 310 (not shown) or by washing the biomass in the biomass preparation portion 301 to provide a steady supply of steam 717, to hydrate the biomass to operate the dryer at a high effective moisture content, for example 50% moisture content on a wet basis. It may also be desirable to move biomass 657 through dryer 310 at a rate where biomass 735 has a constant moisture content, as determined by S7 of, for example and without limitation, of 10% to 20%. This control provides for a more uniform feed to torrefier 320, and prevents steam 717 from becoming superheated. An additional benefit is that less torrefaction will occur in dryer 310. A small flow of steam from dryer 310 into torrefier 320 can also serve to limit the backward flow of torr gases from the torrefier to the dryer.

In addition to the control of biomass through system 200, control system 110 may operate heat recovery unit 220 to change the pressure in line 721, and thus the temperature of heat exchanger portions 310 and 320.

Control system 110 may also control the speed of motors 653, 747, 766, 773, and/or 775 to match the flow rate of biomass through the other components and prevent the build up or total removal of biomass in the various components.

The time that the biomass is in biomass torrefier 320 may be, for example and without limitation, between approximately 5 minutes and approximately 60 minutes. The time may be, for example, approximately 5 minutes, approximately 10 minutes, approximately 15 minutes, approximately 20 minutes, approximately 25 minutes, approximately 30 minutes, approximately 35 minutes, approximately 40 minutes, approximately 45 minutes, approximately 50 minutes, approximately 55 minutes, or approximately 60 minutes. In another embodiment, the time is controllable between a minimum time and a maximum time, where the minimum time is any one of the following approximate times: 5, 10, 15, 20, 25, 30, 35, 40, 45, 50, or 55 minutes and the maximum time is any one of the following approximate times: 10, 15, 20, 25, 30, 35, 40, 45, 50, 55, or 60 minutes. In other embodiments, the time may be less than 5 minutes or greater than 60 minutes.

The material evolved from the biomass in biomass dryer 310 is primarily water, which exits the biomass dryer as liquid water 719 and as steam 717. The liquid water 719 may be provided at "A" to wash the incoming biomass, or provided to output 117. The steam is provided to power generator 230, where energy is extracted for power generation. The condensed water may then be returned at "B" to wash the incoming biomass, or provided to output 117.

The material evolved from the biomass in biomass torrefier 320 is a torrefaction gas 751, which is provided to heat recover unit 220 for recovery of the heat of combustion of the torrefaction gases.

Next, the torrefied biomass in cooled in biomass cooler 330. The outside of cooling biomass cooler 330 is provided with liquid water selected by valve V2 as coming from biomass evolved water from biomass dryer 310 (at "A"), from power generator 230 (at "B") or from water input 102. Liquid level LL2 is used to sense the water level and operate water pumps to ensure that the heat exchanger is filled, or nearly filled, with liquid water. The cooling water leaves biomass cooler 330 as steam, which is provided, along with steam 717 from biomass dryer 310, to power generator 230. Biomass cooler 330 is maintained at a temperature of 120° C. to 200° C.

Liquid water is also provided at inlet 764 into the biomass portion of cooling biomass cooler 330. This water evaporates when contacting the biomass in biomass cooler 330. The flow of water at inlet 764 is provided to prevent or greatly inhibit torrefaction gases from flowing out of biomass torrefier 320, and thus facilitate the removal of torrefaction gases in line 213.

The biofuel leaving cooling biomass cooler 330 is then ground, in grinder 772, and compressed in briquetter 774 to produce biocoal at output 111. Briquetter 774 preferably acts as a load lock, preventing or reducing the flow of gases from biomass cooler 330. Optionally, an additional load lock may be provided at or near biomass compression portion 340.

Heat recovery unit 220 pressurizes ambient air in blower 790, heats it in recuperator 787, and then, according to the operation of valve V4 mixes the heated air with torr gases 213 and, alternatively, with auxiliary fuel from input 105-2.

The resulting combustible mixture 780 is then reacted in catalytic combustor 781, which may include heat transfer augmenter 785 and heat transfer tube 783 for heating the heat transfer fluid (from "K" and "H," and supplied to "J" and "L"). The output of the combustor is provided to recuperator 787 for preheating the air, and then to power generator 230 for electric energy production. The heat recovered from the torr gas can is divided between the biomass processor 210 and power generator 230.

In certain embodiments, it is desired to maintain catalytic combustion at some optimal temperature, for example and without limitation, from between 250° C. and 800° C. Thus, for example, higher temperatures may cause the catalyst to deactivate and possible structurally collapse and a lower temperature will be unable to initiate or support combustion. Additionally, high temperatures will tend to degrade the phase change fluid. Thus, it may be of advantage to provide a means to moderate the temperature of the catalytic reaction.

In certain embodiments, combustible gas mixture 780 is run lean—and may have, for example a stoichiometry of 0.50. In addition to the previously mentioned advantages, running combustor 781 lean provides for complete combustion of the torrefaction gases and keeps the temperature of the combustor low, and prevents fouling of the system due to incomplete combustion of the volatiles.

Power generator 230 recovers heat from steam generated in biomass dryer 310 and heat recovered in the heat transfer fluid in heat recovery unit 220 into output of the combusted torr gases 789, uses the recovered energy to operate a heat engine to generate electricity at power output 231, and then discharge the exhaust at output 115.

In another embodiment, an optional pressure regulator V3, shown in FIG. 4, is provided between steam obtained from drying the biomass in dryer 310 and the power generation unit 230. Pressure regulator V3, which provides saturated steam at elevated pressure, such as 0.1 MPa and 120° C.

System Simulation

An analysis was performed to analyze how various parameters (such as feedstock moisture content) affect the overall heat and mass balances. These calculations were conducted for the nominally 1ton/hr (1,000 kg/hr) device, utilizing the apparatus of FIGS. 3A, 4, 3C and 3D, where Table 1 lists the input parameters.

TABLE 1

| Input parameters for mass and energy balances - 1 ton/hour (1,000 kg/hr) scale. | |
|---|---|
| Parameter | Value |
| Feedstock feed rate | 2.8 tons/hr (2,500 kg/hr) |
| Feedstock moisture mass fraction, wet basis (at 609) | 50% |
| Moisture mass fraction of partially dried wood 735 entering torrefier | 0%-60% |
| Heat of combustion of dry feedstock | 20 MJ/kg |
| Heat of combustion of torrefied wood | 25 MJ/kg |
| Yield of torrefied wood - dry wood basis | 68% |
| Air specific heat capacity | 1 kJ/kg-K |
| Air/fuel mass ratio in combustor (at 780) | 3.29 |
| Wood specific heat capacity | 1.5 kJ/kg-K |
| Liquid water specific heat capacity | 4.2 kJ/kg-K |
| Torrefied wood specific heat capacity | 1.5 kJ/kg-K |
| Water heat of vaporization | 2260 kJ/kg |
| Steam specific heat capacity | 1.9 kJ/kg-K |

TABLE 1-continued

Input parameters for mass and energy balances - 1 ton/hour (1,000 kg/hr) scale.

| Parameter | Value |
|---|---|
| Heat of torrefaction | 0 kJ/kg |
| Exhaust gas specific heat capacity | 1.5 kJ/kg-K |
| ORC efficiency | 10% |

The moisture content (MC %) is a very significant feedstock variable. Using experimental measurements, discussed subsequently, the analysis provided a calibrated model for estimating system performance. Specifically, Table 2 shows the effect of moisture content on the operation of the system. The first column is the moisture content of the biomass being provided to the biomass dryer, on a percent wet basis. The second column is the amount of time spent in biomass dryer 310 at a temperature of 300° C., the third column is the amount of time spent in biomass torrefier 320 at a temperature of 300° C., the fourth column is the sum of the time spent in heat exchanger portions 310 and 320, the fifth column is the amount of water evolved, per ton of wet biomass, and the sixth column is the amount of wet biomass processed, per day.

TABLE 2

The effect of moisture content on the operation of the system

| % MC Wet Basis | Dry Time sec | Torr Time sec | Total Time sec | Mass Water ton/ton (kg/kg) | ton/day (kg/day) |
|---|---|---|---|---|---|
| 0% | 0.0 | 12.6 | 12.6 | 0.00 | 30.10 (27310) |
| 10% | 2.5 | 12.5 | 15.0 | 0.11 | 25.28 (22930) |
| 20% | 5.6 | 12.6 | 18.2 | 0.25 | 20.81 (18880) |
| 30% | 9.6 | 12.6 | 22.2 | 0.43 | 17.05 (15470) |
| 40% | 15.0 | 12.6 | 27.6 | 0.67 | 13.74 (12460) |
| 50% | 22.5 | 12.6 | 35.1 | 1.00 | 10.80 (9797) |
| 60% | 33.8 | 12.6 | 46.4 | 1.50 | 8.18 (7420) |

This analysis illustrates that system 200 may be controlled to provide torrefied biomass for a very wide range of biomass moisture content.

The torrefaction chemistry and heat exchanger design are preferably operated at an autothermal point, where the chemical energy in the torr gases is just sufficient to support production. For example, a 40% MC feedstock, with 20 MJ/kg Higher Heating Value (HHV), can produce at 35% yield of torr gas with 11 MJ/kg and a solid product at 65% yield of 25 MJ/kg, and be self sustaining, including system heat losses. The system output may be for instance 1 ton per hour, with an electrical production of 50 kW.

As another example, a 30% MC feedstock, with 20 MJ/kg HHV, can produce at 25% yield a torr gas with 11 MJ/kg and a solid product at 75% yield of 23 MJ/kg. The system output in this case would be 1.5 tons per hour (1400 kg/hr), and the electrical production of 75 kW. In this case less energy is required for drying and the system runs more quickly and uses the excess energy to produce power.

The simulation indicates that the torrefaction gases in line 213, see for instance FIG. 3B, include combustible gases including acetic acid, lactic acid, furfural, formic acid, hydroxyl acetone, methanol, carbon monoxide, and non-combustible gases including water and carbon dioxide.

Figure 11:
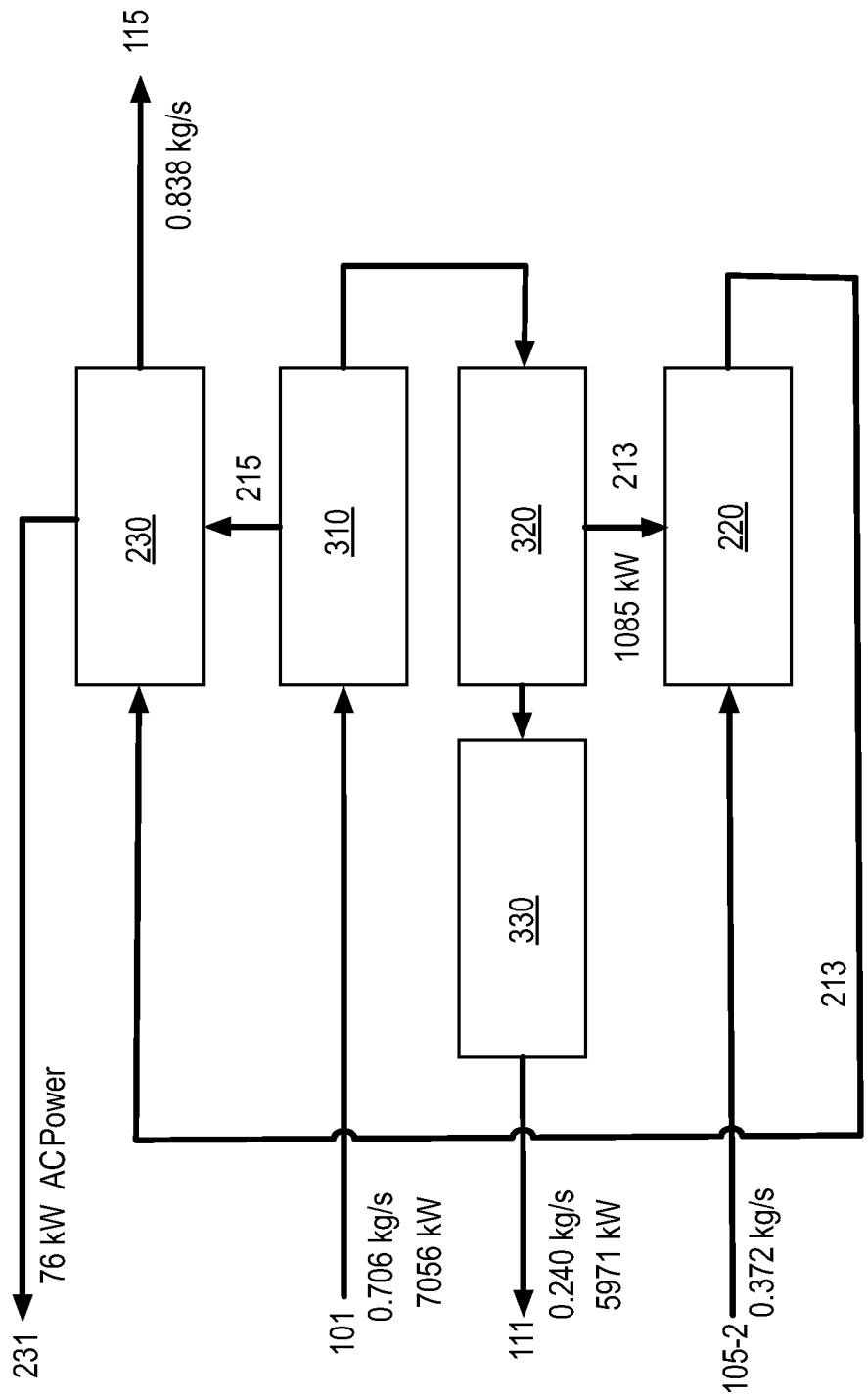
FIG. 11 shows the flow of mass and chemical energy at various points in the system of FIG. 2A.
Figure 12:
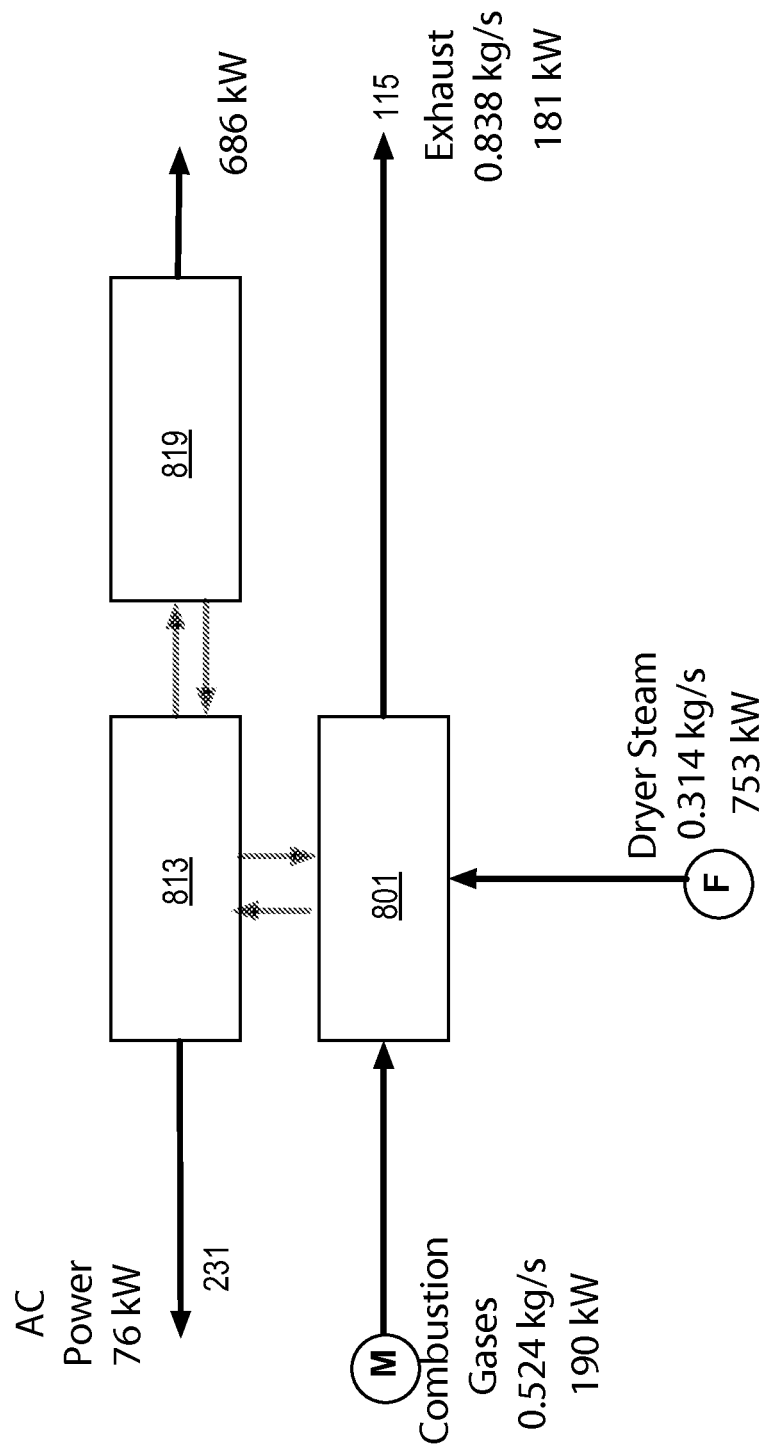
FIG. 12 shows the flow of mass and chemical energy in a power generator.

FIGS. 11 and 12 show the mass flow and energy flow in the system, and indicate that that there is sufficient energy in the torrefaction gases to operate the entire system, and thus provide "stand-alone" operation, where biomass may be converted to biocoal without the need for additional fuel or electricity.

FIG. 11 shows the flow of mass and chemical energy at various points in system 200. Importantly, the amount of energy in the biofuel 111 (5971 kW) is a substantial fraction of the energy available in the original biomass 101 (7056 kW) and is in a much more useful state, being compatible with coal. In addition, a significant amount of electrical power 231 (76 kW) is available for running system 200.

FIG. 12 shows the flow of mass and sensible energy in power generator 230. The torrefaction gases M have 190 kW of chemical energy which is supplemented by the sensible energy in the steam and which provides for 76 kW of electrical energy, 231.

It is expected that apparatus 200 may be used to convert biomass to biofuel over a wide range of conditions. Thus, for example, biomass may have a water content of from approximately 5% to approximately 60%, and have varying amounts of lignin and other compounds. In addition, it may be desirable to produce a biofuel having a controlled energy content and/or density.

Thus, for example, the biofuel may have a heating value of between 9,000 Btu per pound (20934 kJ/kg) and 12,000 Btu per pound (28,000 kJ/kg) on an ash free basis, and a density after densification of between 0.8 g/cm$^3$ (800 kg/m$^3$) and 1.4 g/cm$^3$ (1400 kg/m$^3$). The heating value, which is greater that that of the biomass, is accomplished by heating the biomass in the absence of oxygen, allowing water and volatile organic compounds resulting from the breakdown the cellulose and hemi-cellulose to be created and driven off. The high density is accomplished through maintaining the temperature below the level where the lignin is significantly chemically altered, and by subsequent compression into pellets.

For the simpler case of a single auger drier and torrefier, the dwell time (set by the auger speed, inch/min, controlled by 747), heat exchanger temperature (set by the pressure of the heat transfer fluid, 300° C./2 bar (0.2 MPa) of 721, measured at S12, and load size (set by the feed auger, kg/min of 101, controlled by 637 are all be independent and can be used in combination. Thus, for example, at constant temperature and load rate, low moisture content feedstock will move faster through the auger (i.e. 15 minutes) compared to a high moisture content feedstock (i.e. 30 minutes). Alternatively, at constant temperature and auger speed, a higher feed rate is appropriate for the dry material. Further, at constant auger speed and feed rate, a higher temperature is appropriate for the wet feedstock.

The torrefaction gas production rate is correlated to the torrefied solid product production rate by: Feedstock HHV=Torr Gas HHV+Torr Biomass HHV At constant feedstock moisture content, temperate and feed rate, higher torr gas rates are accomplished by reducing the auger speed, with the result that the solid product has both lower total energy, and higher energy density. Similarly with increasing temperature and constant feed rate.

The energy in the Torr gas is needed to dry, torrefy and produce power. The energy to torrefy is constant across moisture content. The energy required to dry is linearly related to the moisture mass in the feedstock. The power required is directly related to production rate, as the major electrical loads of pressurizing air, grinding and densification are proportional to throughput.

Apparatus Control

As discussed above, apparatus 200 may include a variety of sensors to measure temperature, pressure, gas composition, humidity, liquid and solid levels, flow rates, biomass composition or other parameters of the process. In addition, it has been shown that the sensors may include spectroscopic techniques may be used to obtain qualitative or quantitative characteristics of the biomass, partially torrefied biomass, and biofuel. These characteristics may include energy density, material type of origins (such as plant species of biomass), moisture content, elemental or chemical composition, presence and concentration of contaminants, among others. These characteristics may also be utilized in a variety of ways to control the apparatus.

In certain embodiments the energy content, Cv, or energy density of the processed biomass is monitored and used to control the process. Measurement of Cv can be made in a calorimeter by destructive sampling on a small amount of material, sampled at the output, or more preferably spectroscopically, as described above by sensor(s) S7, S9, or S11. The measurement process can be automated using auto-sampling techniques and the Cv information provided in "real time" every few minutes. By making this measurement in "real time" as the system operates adjustments to the process can be made to assure consistent energy content of the output product regardless of the input biomass, which may be variable and unknown with respect to plant species, moisture content, particle size or other properties. If the measured output Cv is lower than desired, indicating a lower level of torrefaction than desired, the process temperature and/or process reaction time can be increased, and vice versa if the measured output Cv is higher than desired.

In some situations (for example if biomass species is expected to be constant, but moisture content may vary) it may be best to control for the desired output property(s) by adjusting process reaction time while holding process temperature constant, while in other situations (for example if biomass species may be varying among species with very different optimum process temperature) it may be best to adjust the process temperature while holding the process reaction time constant, and in still other situations it may be best to utilize a combination of the two. In addition, the size and direction of these adjustments of process parameters may be chosen in a number of ways, including simple constant incremental adjustments depending only on the sign of the measured error in the output property(s), adjustments that also depend on the magnitude of the error signal, adjustments made by more sophisticated algorithms such as proportional-integral-derivative (PID) controllers, adjustments made by algorithms that determine the optimum size and direction of adjustment by trying and characterizing the system response, or by other control techniques known in the art.

In certain embodiments, knowledge of the type of biomass material being processed, for example that it is from a particular part of a particular species of plant, can be utilized in controlling the process. For instance in a setting of mostly birch trees entering that information will help the control algorithm optimize the process. Birch torrefies best at a lower temperature and longer time than does pine. Thus if the input biomass is known to control system 110 to be birch for instance, and if the control system determines that there is a decrease in the energy content, sometimes called calorific value, Cv of the biofuel, then the control system may increase the time spend in the torrefaction reactor by slowing one or more auger speeds. For other materials, control system 110 may to adjust both temperature and reaction time to accommodate other species, such as pine, which process best at elevated temperatures, but are not as reactive to longer processing times. Material type information can be obtained in several ways, including operator manual input and spectroscopic analysis of the input biomass material.

Additionally, if moisture content of the input biomass is measured, say at sensor S5 on FIG. 4, one or more process augers (for example in a drying section) could be preemptively slowed down (or speeded up) to allow more (or less) time for more (or less) moisture to be removed.

One indicator of the quality of the finished product is its visible color. In general starting biomass is a lighter tan, properly torrefied is darker brown and over torrefied has a black or charcoal color. Monitoring the color of the output product provides information to the control system allowing process parameter adjustment in real time. Color monitoring can be accomplished by a number of technologies spanning color video cameras to color sensing IC devices. Operators can also asses color by comparison to sample colors and manual input to the process control system.

Apparatus Logging

In certain embodiments important input material or output product properties may be measured and recorded by a sample property logging subsystem of control system 110. Thus, for example, important measured material properties may be stored for later reference including input material plant species, energy content, moisture content, ash content, ash composition analysis, elemental analysis, and output product energy content, moisture content, density, ash content, ash composition analysis, elemental analysis. In addition, control system 110 may also store intermediate or raw data that has been measured, and used to derive the material property measurements, such as raw optical spectral data from the spectral analyzers. The logged sample property data can be stored locally on the system, as well as uploaded to a remote data center to be made available to users of the output product. In addition to the measured sample property data, each measurement or set of measurements may be associated (via standard computing and data base procedures) with a number of sample identification parameters to allow them to be correlated to a particular lot of output product that will also be associated with a similar set of identification parameters. Examples of useful sample and product identification parameters include:

Processing system ID number

Date and time

Processing system location (as entered by operator or by other means)

Job or project name (as entered by operator or by other means)

Input feed stock lot identification information if available (as entered by operator or by other means)

Input feed stock material properties if available, such as plant species or mix of species, moisture content, particle size, or other relevant properties or comments. (as entered by operator or by other means)

Operator name and company (as entered by operator or by other means)

Location in the process where the sample material the measurements were made on was extracted from or where it was measured non-extractively. For example was this a measurement of input material, partially processed material, fully processed output product, etc. . . . (as entered by operator during measurement or by other automated means). This parameter is valid for measured samples and not for product lot identification.

Sample ID number or Product Lot ID number

In certain embodiments, the logged data is used to provide certification as to the quality of the biofuel. In certain embodiments a sample of biomass or torrefied biomass may be collected, stored and provided with reference number to correlate the sample with logged data.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method for the continuous torrefaction of biomass to obtain a fuel of specified or constant properties, said method comprising:
    sensing a property of biomass; and
    controlling the torrefaction in proportion to said property, wherein said sensing senses a mid-infrared spectra of torrefied biomass, and wherein said controlling includes utilizing a correlation of mid-infrared spectra and two ratios of H, C, and O atoms to estimate, based on said correlation and said sensed spectra, two ratios of H, C, and O atoms in the sample, and changing torrefaction parameters to approach the target values of H, C, and O atoms.

2. The method of claim 1, where said sensing estimates the heating value of biomass.

3. The method of claim 2, where said sensing includes sensing the heating value of biomass.

4. The method of claim 2, where said sensing includes sensing an optical property of biomass.

5. The method of claim 4, where said optical property is sensed using visible light.

6. The method of claim 4, where said optical property is sensed using mid-infrared light.

7. The method of claim 1, where said sensing estimates the moisture content of the biomass.

8. The method of claim 1, where said controlling controls the torrefaction temperature.

9. The method of claim 1, where said controlling controls the time during which the biomass is torrefied.

10. The method of claim 1, where said sensing estimates a physical or chemical property of the biomass, and where said controlling controls the conditions of torrefaction to obtain target fuel properties.

11. The method of claim 1, further including logging information related to the biomass or fuel.

12. The method of claim 1, further including storing fuel samples.

13. The method of claim 1, where said sensing a property of the biomass senses the property during the torrefaction of the biomass.

14. A method for the continuous torrefaction of biomass to obtain a fuel of specified or constant properties, said method comprising:
    sensing a property of the biomass during the torrefaction of the biomass; and
    controlling the torrefaction in proportion to said property.

15. The method of claim 14, where said sensing estimates the heating value of biomass.

16. The method of claim 15, where said sensing includes sensing the heating value of biomass.

17. The method of claim 15, where said sensing includes sensing an optical property of biomass.

18. The method of claim 17, where said optical property is sensed using visible light.

19. The method of claim 17, where said optical property is sensed using mid-infrared light.

20. The method of claim 14, where said sensing estimates the moisture content of the biomass.

21. The method of claim 14, where said controlling controls the torrefaction temperature.

22. The method of claim 14, where said controlling controls the time during which the biomass is torrefied.

23. The method of claim 14, where said sensing estimates a physical or chemical property of the biomass, and where said controlling controls the conditions of torrefaction to obtain target fuel properties.

24. The method of claim 14, further including logging information related to the biomass or fuel.

25. The method of claim 14, further including storing fuel samples.

* * * * *